United States Patent
Yamakawa et al.

(10) Patent No.: US 8,121,010 B2
(45) Date of Patent: Feb. 21, 2012

(54) HOLOGRAM DEVICE, TILT DETECTION METHOD, AND TILT CORRECTION METHOD

(75) Inventors: Akio Yamakawa, Tokyo (JP); Yoshiki Okamoto, Kanagawa (JP); Kenji Tanaka, Tokyo (JP); Kazutatsu Tokuyama, Tokyo (JP); Koji Takasaki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/731,306

(22) Filed: Mar. 25, 2010

(65) Prior Publication Data

US 2010/0265808 A1 Oct. 21, 2010

(30) Foreign Application Priority Data

Apr. 17, 2009 (JP) .................................. 2009-100665

(51) Int. Cl.
*G11B 7/00* (2006.01)

(52) U.S. Cl. ..................................... 369/103; 369/53.19

(58) Field of Classification Search .................. 369/103, 369/53.19
See application file for complete search history.

(56) References Cited

U.S. PATENT DOCUMENTS

| | | | |
|---|---|---|---|
| 2003/0031112 A1* | 2/2003 | Horimai | 369/244 |
| 2004/0037196 A1* | 2/2004 | Matsumoto et al. | 369/53.19 |
| 2009/0103153 A1* | 4/2009 | Usami et al. | 359/24 |

FOREIGN PATENT DOCUMENTS

JP 2007-79438 3/2007

* cited by examiner

*Primary Examiner* — Adam R Giesy
(74) *Attorney, Agent, or Firm* — Oblon, Spivak, McClelland, Maier & Neustadt, L.L.P.

(57) ABSTRACT

A hologram device includes: a light source for applying light to a hologram recording medium having a recording layer in which information recording is performed by interference fringes between signal light and reference light; a spatial modulation unit that generates the signal light and/or the reference light and generates a marker light in a predetermined position within an incident surface of the light from the light source by performing spatial light modulation on the light from the light source; a light applying unit that applies the light subjected to spatial light modulation by the spatial light modulation unit to the hologram recording medium via an objective lens; a light receiving unit that receives the light applied via the objective lens through the hologram recording medium; and a tilt detection unit that obtains a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

14 Claims, 15 Drawing Sheets

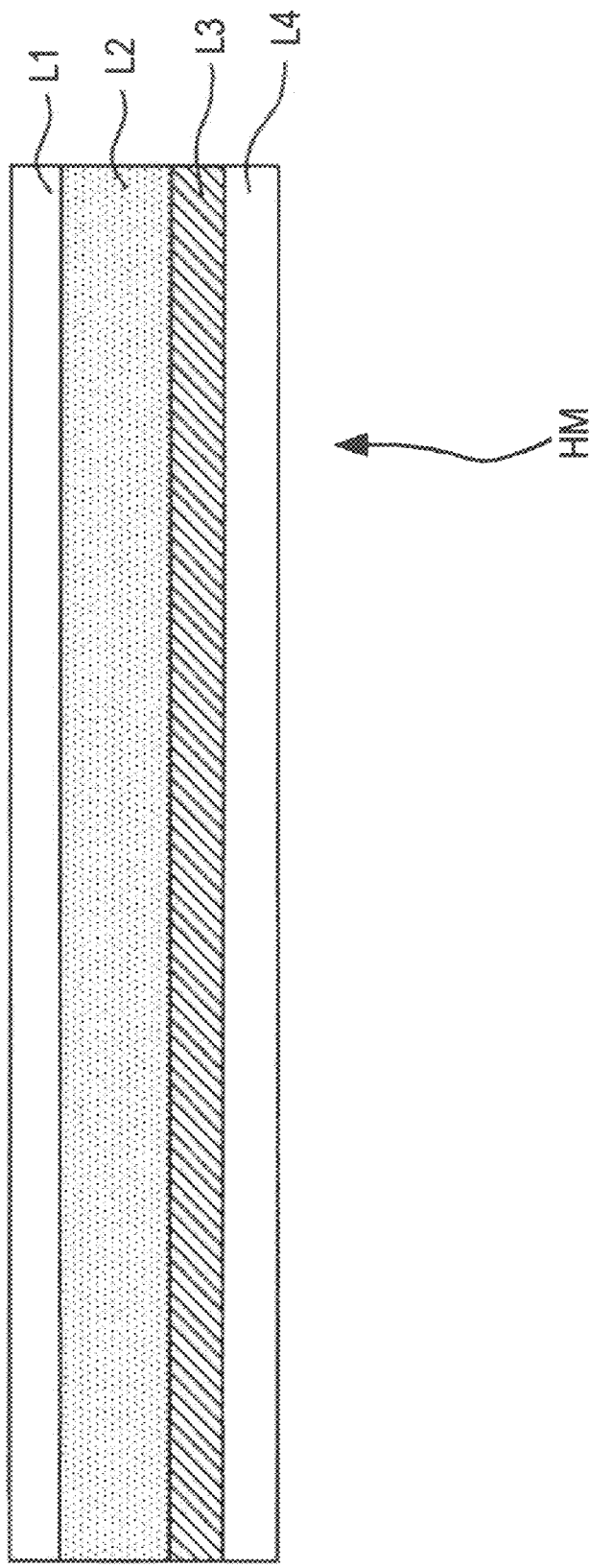

VOLTAGE ON
(DATA "1")

VOLTAGE OFF
(DATA "0")

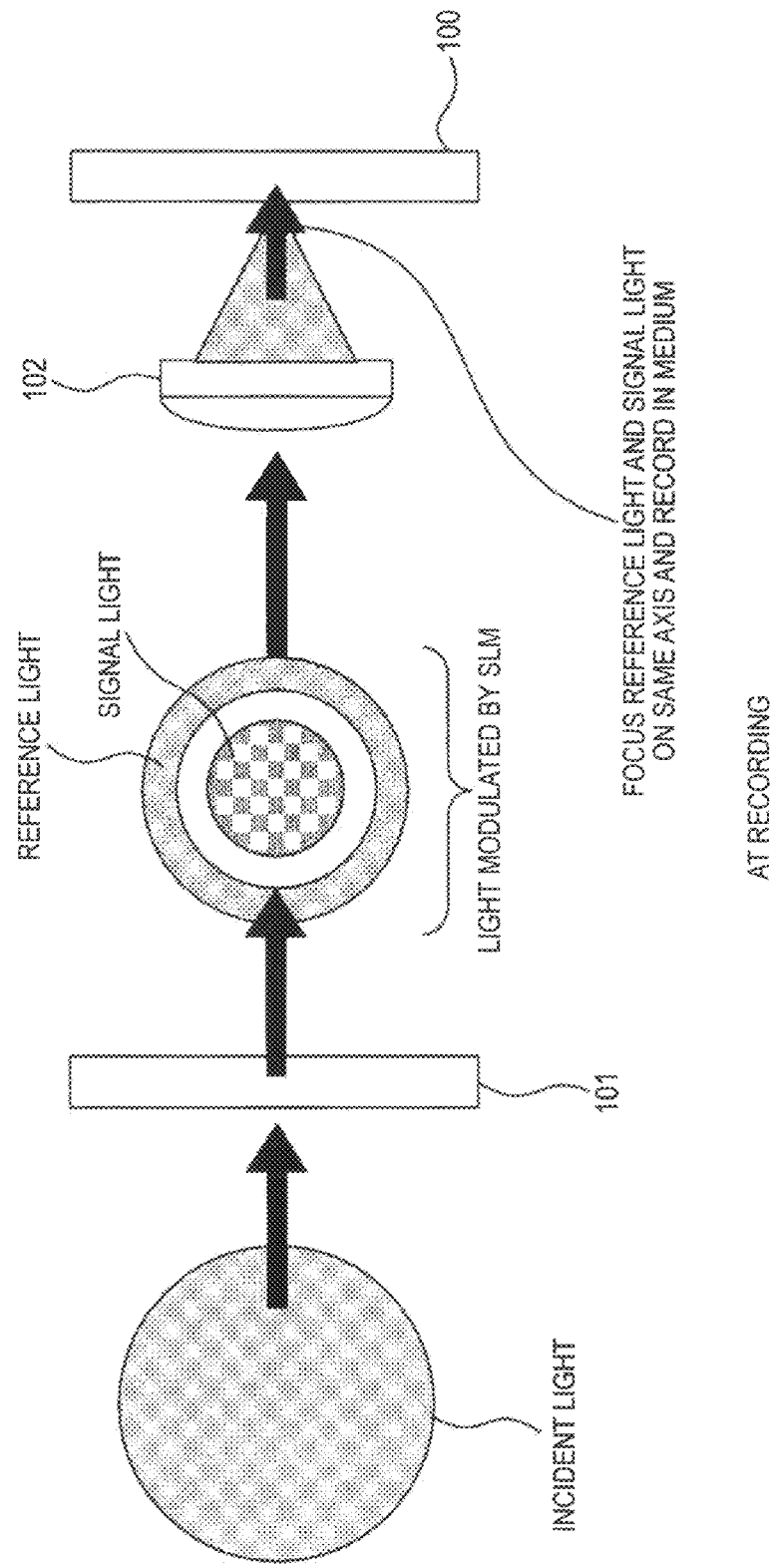

HOLOGRAM DEVICE, TILT DETECTION METHOD, AND TILT CORRECTION METHOD

BACKGROUND OF THE INVENTION

1. Field of the Invention

The present invention relates to a hologram device that performs recording and/or reproduction for a hologram recording medium in which information is recorded using interference fringes between signal light and reference light. Further, the present invention relates to a tilt detection method of detecting a tilt angle as an angle formed by an information recording surface of the hologram recording medium and an optical axis of irradiating light via an objective lens, and a tilt correction method for correction of the tilt angle.

2. Background Art

As disclosed in JP-A-2007-79438, for example, a hologram recording and reproduction method of performing data recording by forming a hologram is known. In the hologram recording and reproduction method, at recording, signal light subjected to spatial light intensity modulation (intensity modulation) according to recording data and reference light provided with a predetermined light intensity pattern are generated and applied to a hologram recording medium, and thereby, a hologram is formed on the recording medium for data recording.

Further, at reproduction, the reference light is applied to the recording medium. In this way, to the hologram formed according to the application of the signal light and the reference light at recording, the same reference light as that at recording (having the same pattern as that at recording) is applied, and thereby, diffracted light according to the recorded signal light component is obtained. That is, a reproduced image (reproduced light) according to the recording data is obtained. The reproduced light obtained in this manner is detected by an image sensor such as a CCD (Charge Coupled Device) sensor or a CMOS (Complementary Metal Oxide Semiconductor) sensor, for example, and thereby, reproduction of the recorded data is performed.

As the hologram recording and reproduction method, a so-called coaxial method of aligning reference light and signal light with the same optical axis and applying them to a hologram recording medium via a common objective lens is known.

FIGS. 14 and 15A and 15B are diagrams for explanation of hologram recording and reproduction using the coaxial method, and FIG. 14 schematically shows a recording method and FIGS. 15A and 15B schematically show a reproduction method.

In FIGS. 14 and 15A and 15B, the case of using a reflective-type hologram recording medium 100 having a reflection film is shown as an example.

First, in the hologram recording and reproduction system, as shown in FIGS. 14 and 15A and 15B, for generation of signal light and reference light at recording and reference light at reproduction, an SLM (special light modulator) 101 is provided. As the SLM 101, an intensity modulator that performs light intensity modulation on incident light with respect to each pixel is provided. As the intensity modulator, for example, a liquid crystal panel may be used.

At recording shown in FIG. 14, signal light provided with an intensity pattern according to recording data and reference light provided with a predetermined intensity pattern are generated by the intensity modulation of the SLM 101. In the coaxial method, the signal light and the reference light are aligned with the same optical axis as shown in the drawing and spatial light modulation on incident light is performed. In this regard, generally, the signal light is aligned at the inside and the reference light is aligned at the outside thereof as shown in the drawing.

The signal light and reference light generated in the SLM 101 are applied to the hologram recording medium 100 via an objective lens 102. Thereby, a hologram reflecting the recording data is formed on the hologram recording medium 100 by interference fringes between the signal light and the reference light. That is, recording of data is performed by the formation of the hologram.

On the other hand, at reproduction, the reference light is generated in the SLM 101 in the manner shown in FIG. 15A (here, the intensity pattern of the reference light is the same as that at recording). Then, the reference light is applied to the hologram recording medium 100 via the objective lens 102.

In response to the application of the reference light to the hologram recording medium 100, as shown in FIG. 15B, diffracted light according to the hologram formed on the hologram recording medium 100 is obtained, and thereby, a reproduced image (reproduced light) with respect to the recorded data is obtained. In this case, the reproduced image is guided as reflected light from the hologram recording medium 100 to an image sensor 103 via the objective lens 102 as illustrated.

The image sensor 103 receives the reproduced image guided in the above described manner with respect to each pixel and obtains electric signals according to amounts of received light with respect to each pixel, and thereby, obtains a detected image with respect to the reproduced image. In this way, the image signals detected in the image sensor 103 are used as readout signals with respect to the recorded data.

Here, the hologram recording and reproduction system as described above has a problem that reproduction performance is deteriorated due to the occurrence of a so-called tilt, as is the case of existing optical disc systems of CD (Compact Disc), DVD (Digital Versatile Disc), or the like.

In the case of the hologram recording and reproduction system, an image shift of the reproduced image occurs due to the occurrence of a tilt and causes deterioration of the reproduction performance.

Further, if a tilt occurs, it may be possible that a shift occurs between the application angle of the reference light at recording of the hologram and the application angle of the reference light applied at reproduction of the hologram, and acquisition of the reproduced image by diffraction is not properly performed. In this respect, deterioration of the reproduction performance is also caused.

Here, for correction of the tilt, first, the detection of the tilt angle (i.e., detection of an error from the tilt angle=0°) is conceivable. That is, correction is performed by cancelling the detected tilt angle.

For the detection of the tilt angle, there is a method using a sensor that directly detects the tilt of the recording medium as a so-called tilt sensor.

Alternatively, a method of performing tilt correction without especially performing the detection of the tilt angle is conceivable.

Specifically, an amount of reproduced light is used as an evaluation index with respect to the tilt angle and correction is performed on the tilt angle at which the largest amount of reproduced light is obtained.

SUMMARY OF THE INVENTION

However, in the case where the correction method using the tilt sensor is employed as described above, it is necessary to separately provide another sensor in addition to the configuration for recording/reproduction, and downsizing of the device and the cost reduction of the device manufacturing are not realized in this respect.

Further, the method using the amount of reproduced light as an evaluation index with respect to the tilt angle is a method of a so-called hill-climbing method, and the time for correction is longer.

Here, it is conceivable that the tilt correction is performed as tilt servo for following the sequential changes of the tilt angle with the rotation of the recording medium, however, the correction method using the hill-climbing method has a problem in responsiveness, and accordingly, causes reduction in servo accuracy.

A hologram device according to an embodiment of the invention has the following configuration.

That is, the device according to the embodiment of the invention includes a light source that applies light to a hologram recording medium having a recording layer in which information recording is performed by interference fringes between signal light and reference light.

Further, the device includes a spatial light modulation unit that generates the signal light and/or the reference light and generates a marker light in a predetermined position within an incident surface of the light from the light source by performing spatial light modulation on the light from the light source.

Furthermore, the device includes a light applying unit that applies the light subjected to spatial light modulation by the spatial light modulation unit to the hologram recording medium via an objective lens.

Moreover, the device includes a light receiving unit that receives the light applied via the objective lens through the hologram recording medium.

In addition, the device includes a tilt detection unit that obtains a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

Further, a tilt detection method according to another embodiment of the invention is configured as follows.

That is, the tilt detection method according to the embodiment of the invention is a tilt detection method in a hologram device including a light source that applies light to a hologram recording medium having a recording layer in which information recording is performed by interference fringes between signal light and reference light, a spatial light modulation unit that generates the signal light and/or the reference light by performing spatial light modulation on the light from the light source, a light applying unit that applies the light subjected to spatial light modulation by the spatial light modulation unit to the hologram recording medium via an objective lens, and a light receiving unit that receives the light applied via the objective lens through the hologram recording medium, and the method has the step of generating a marker light in a predetermined position within an incident surface of the light from the light source using the spatial light modulation unit.

Further, the method has the step of obtaining a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

Furthermore, a tilt correction method according to still another embodiment of the invention is configured as follows.

That is, the tilt correction method according to the embodiment of the invention is a tilt correction method in a hologram device including a light source that applies light to a hologram recording medium having a recording layer in which information recording is performed by interference fringes between signal light and reference light, a spatial light modulation unit that generates the signal light and/or the reference light by performing spatial light modulation on the light from the light source, a light applying unit that applies the light subjected to spatial light modulation by the spatial light modulation unit to the hologram recording medium via an objective lens, and a light receiving unit that receives the light applied via the objective lens through the hologram recording medium, and the method has the step of generating a marker light in a predetermined position within an incident surface of the light from the light source using the spatial light modulation unit.

Further, the method has the step of obtaining a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

Furthermore, the method has the step of performing correction of the tilt angle based on the tilt error signal obtained at the tilt detection step.

Here, as will be described later, in the hologram device, a shift of an image formed in a real image surface occurs due to occurrence of a tilt. Therefore, by generating the marker light in the above described manner, applying the marker light to the hologram recording medium and receiving it using the light receiving unit, and detecting the error between the ideal light reception position unit and the real light reception position of the marker light in the light receiving unit, information correlated to the tilt angle can be obtained. In other words, the tilt error signal representing the error from the ideal angle of the tilt angle can be obtained based on the result of the detection of the error between the ideal light reception position unit and the real light reception position of the marker light in the light receiving unit.

Further, according to the tilt correction method of the embodiment of the invention, correction of the tilt angle is performed based on the tilt error signal obtained from the error of the light reception position of the marker light in this manner. That is, thereby, the correction can be performed to make the tilt angle equal to the ideal angle.

According to the embodiments of the invention, detection of the tilt angle (tilt error) can be performed based on the reception result of the marker light in the above described manner.

Thereby, the detection of the tilt can be realized only by the addition of signal processing with respect to the light reception signal by the light receiving unit, and therefore, it may be unnecessary to add a separate configuration by providing a tilt sensor for tilt detection.

In this respect, the downsizing of the device and the cost reduction of the device manufacturing are realized.

Further, according to the embodiments of the invention, tilt correction can be performed based on the tilt error signal representing the error from the ideal angle of the tilt angle. Thereby, the responsiveness of the correction can be significantly improved compared to the case of the correction by the hill-climbing method using the amount of reproduced light as the evaluation index, for example.

Furthermore, in the embodiments of the invention, the tilt error signal can be obtained as a signal having an amplitude increase and decrease of which represent the amount and polarity of the tilt error with reference to the amplitude value of zero. That is, the signal can be obtained as a so-called push-pull signal.

If the tilt error signal of the push-pull signal can be obtained, tilt servo can be realized by performing the tilt correction to cancel the error represented by the tilt error signal.

BRIEF DESCRIPTION OF THE DRAWINGS

FIG. 2 is a sectional view showing a structure example of a hologram recording medium used in the embodiment.

FIG. 14 is a diagram for explanation of a recording method of a hologram by a coaxial method.

DESCRIPTION OF PREFERRED EMBODIMENTS

As below, configurations for implementing the invention (hereinafter, referred to as embodiments) will be explained. The explanation will be made in the following order.
<1. Hologram Recording and Reproduction System of Embodiment>
<2. Regarding Relationship between Tilt and Image Shift>
[2-1. Behavior of Light in Optical System]
[2-2. Generation Principle of Image Shift Due to Tilt]
<3. Tilt Detection and Correction Methods as Embodiments>
[3-1. Generation of Marker Lights]
[3-2. Tilt Detection Method]
[3-3. Tilt Correction Method]
[3-4. Configuration for Realization of Tilt Detection and Tilt Correction Methods]
[3-5. Summary of Embodiments]
<4. Modified Examples>

<1. Hologram Recording and Reproduction System of Embodiment>

Figure 1:
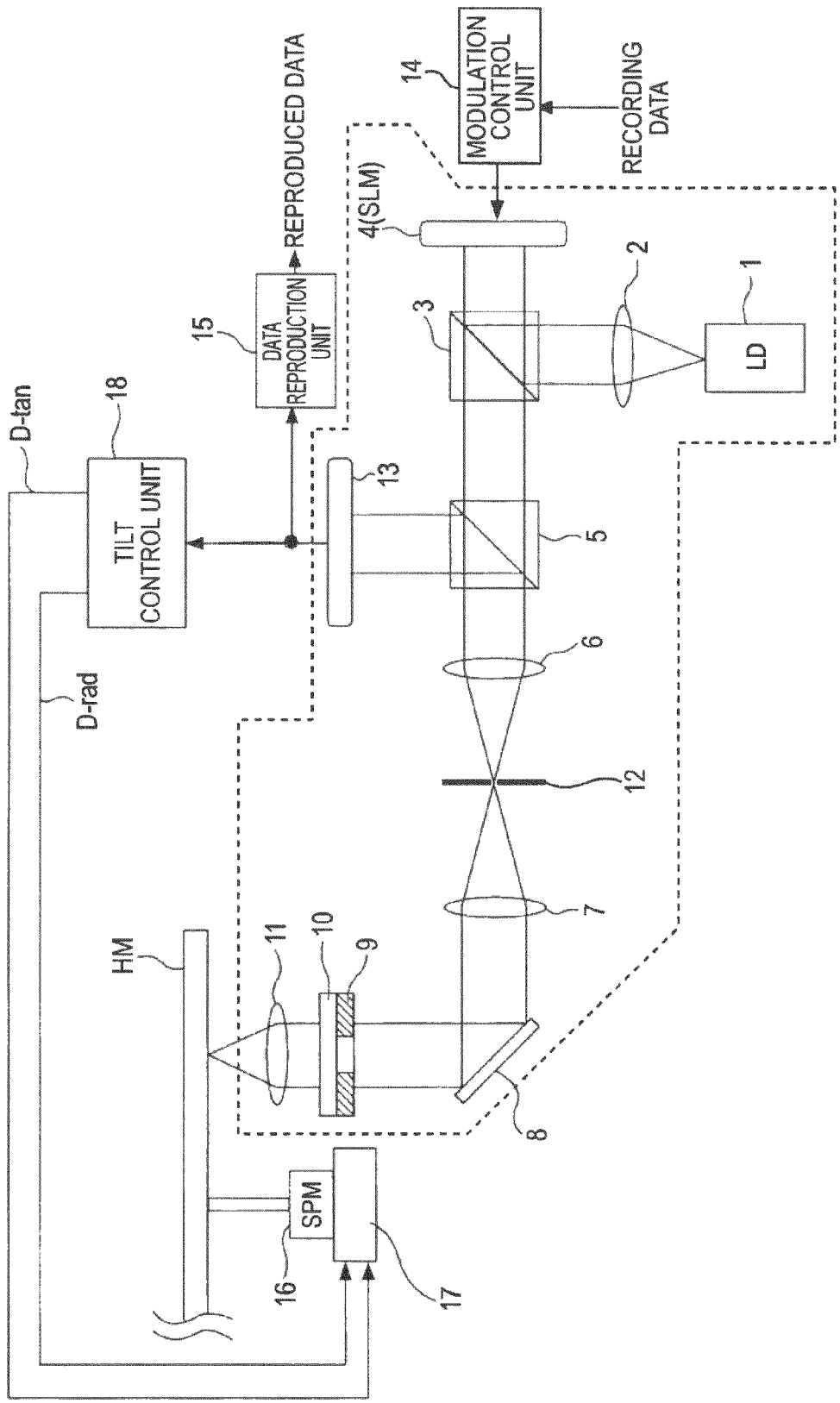
FIG. 1 shows an internal configuration of a hologram device as an embodiment.

FIG. 1 shows an internal configuration of a recording and reproducing device as one embodiment of a hologram device according to an embodiment of the invention.

FIG. 1 mainly shows a configuration of an optical system of the recording and reproducing device of the embodiment with emphasis.

In FIG. 1, a hologram recording medium HM is a recording medium on which information recording is performed using interference fringes between signal light and reference light. Further, the hologram recording medium HM is a disc-shaped recording medium, and recording/reproduction of hologram is performed while the hologram recording medium HM is rotationally driven.

Here, referring to FIG. 2, the structure of the hologram recording medium HM will be briefly explained. FIG. 2 shows a sectional structure of the hologram recording medium HM.

As shown in FIG. 2, in the hologram recording medium HM, a cover layer L1→a recording layer L2→a reflection film L3→a substrate L4 are formed from the upper layer side to the lower layer side.

For confirmation, "upper layer" and "lower layer" here refer to the upper surface side as the upper layer and the lower surface side as the lower layer when the surface that the light for recording/reproduction enters is the upper surface and the surface opposite to the upper surface is the lower surface.

The cover layer L1 includes plastic or glass, for example, and is a protective substrate provided for protection of the recording layer L2 formed in the under layer.

For the recording layer L2, as a material thereof, a material such as photopolymer, for example, on which information recording can be performed using changes of the refractive index according to the intensity distribution of the irradiating light is selected, and recording/reproduction of hologram is performed using a laser beam with a laser diode (LD) 1 as a light source, which will be described later.

Further, the reflection film L3 is provided for returning a reproduced image (reproduced light) according to the hologram recorded in the recording layer L2 obtained according to the application of the reference light at reproduction to the device side as reflected light.

The substrate L4 formed in the under layer of the reflection surface L3 is a protective substrate including plastic or glass, for example.

The explanation is returned to FIG. 1.

Within the recording and reproducing device, the hologram recording medium HM is held to be rotatably driven by a spindle motor (SPM) 16 in the drawing. In the recording and reproducing device, laser beam application for recording/reproduction of hologram is performed to the hologram recording medium HM rotationally driven by the spindle motor 16.

In the case of the embodiment, the spindle motor 16 is held at tilts adjustable by a tilt mechanism 17 in the drawing. Specifically, the tilt mechanism 17 can adjust the tilts in two directions orthogonal to each other, and the tilt mechanism 17 holds the spindle motor 16 so that the tilts in a radial direction and a tangential direction of the hologram recording medium HM held by the spindle motor 16 may be adjustable.

Here, the radial direction is a direction in line with the radial direction of the hologram recording medium HM. Further, the tangential direction is a direction in line with the orthogonal direction to the radial direction (corresponding to the circumferential direction of the hologram recording medium HM, and the formation direction of the hologram recording line).

To the tilt mechanism 17, a radial direction drive signal D-rad and a tangential direction drive signal D-tan are respectively supplied from a tilt control unit 18, which will be described later. The tilt mechanism 17 adjusts the respective tilts of the hologram recording medium HM in the radial direction and the tangential direction by adjusting the tilts of the spindle motor 16 in the respective directions in response to the radial direction drive signal D-rad and the tangential direction drive signal D-tan.

In FIG. 1, the part surrounded by the dotted line in the drawing corresponds to an optical pickup including the optical system for application of the laser beam for recording/reproduction of hologram to the hologram recording medium HM. Specifically, within the optical pickup, the laser diode 1, a collimation lens 2, a polarization beam splitter 3, an SLM 4, a polarization beam splitter 5, a relay lens 6, an aperture 12, a relay lens 7, a mirror 8, a partial diffraction element 9, a quarter-wave plate 10, an objective lens 11, and an image sensor 13 are provided.

The laser diode 1 outputs a blue-violet laser beam having a wavelength λ of about 405 nm, for example, as a laser beam for recording and reproduction of hologram. The laser beam output from the laser diode 1 enters the polarization beam splitter 3 via the collimation lens 2.

Of linearly-polarized components orthogonal to each other of the entering laser beam, the polarization beam splitter 3 transmits one linearly-polarized component and reflects the other linearly-polarized component. For example, in this case, the p-polarized component is transmitted and the s-polarized component is reflected.

Therefore, regarding the laser beam entering the polarization beam splitter 3, only the s-polarized component is reflected and guided to the SLM 4.

The SLM 4 includes a reflective liquid crystal element as an FLC (Ferroelectric Liquid Crystal), and controls the polarization direction of the incident light with respect to each pixel.

The SLM 4 performs spatial light modulation to change the polarization direction of the incident light to 90° with respect to each pixel or not to change the polarization direction of incident light in response to the drive signals from a modulation control unit 14 in the drawing. Specifically, polarization direction control is performed with respect to each pixel in response to the drive signals so that the angle change in the polarization direction may be 90° with respect to the pixel for which the drive signal is turned ON and the angle change in the polarization direction may be 0° with respect to the pixel for which the drive signal is turned OFF.

As shown in the drawing, the output light from the SLM 4 (the light reflected on the SLM 4) enters the polarization beam splitter 3 again.

Here, in the recording and reproducing device shown in FIG. 1, spatial light intensity modulation (referred to as light intensity modulation or simply as intensity modulation) with respect to each pixel using the polarization direction control with respect to each pixel by the SLM 4 and the nature of selective transmission/reflection of the polarization beam splitter 3 according to the polarization direction of incident light.

Figure 3A:
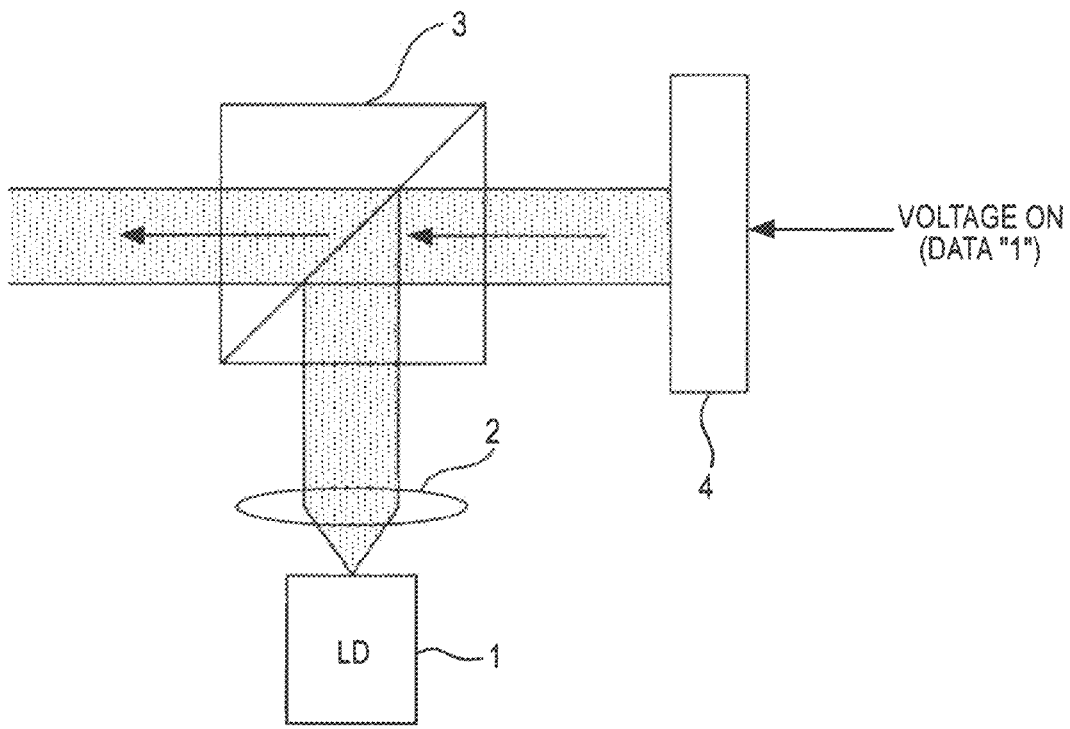
FIGS. 3A and 3B are diagrams for explanation of intensity modulation realized by a combination of a polarization direction-controlled spatial light modulator and a polarization beam splitter.
Figure 3B:
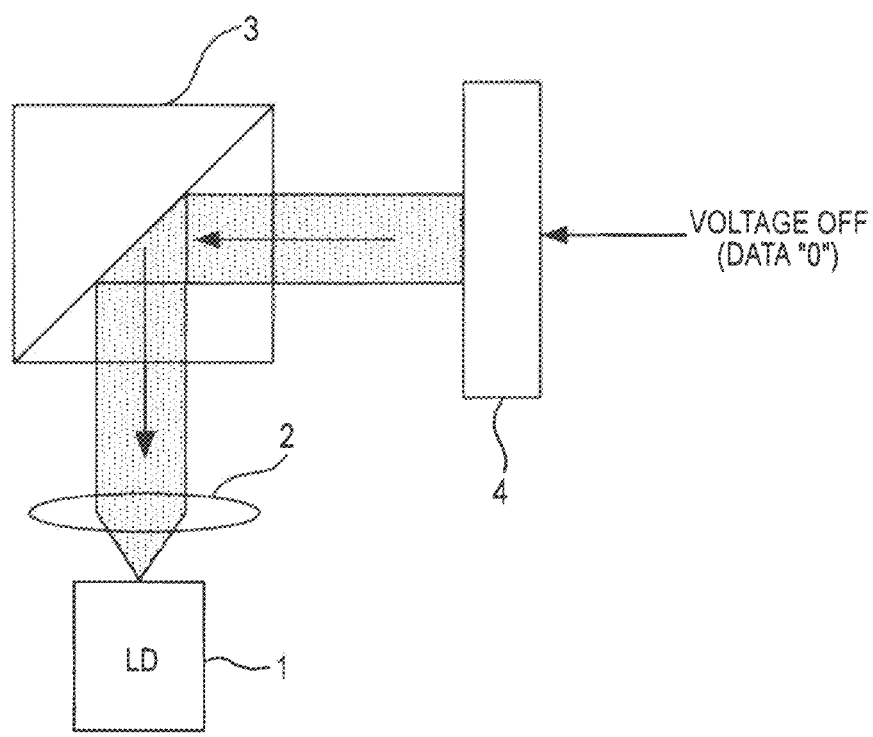

FIGS. 3A and 3B show a concept of intensity modulation realized by a combination of the SLM 4 and the polarization beam splitter 3. The respective beams of light are schematically shown regarding the light of ON-pixel in FIG. 3A and regarding the light of OFF-pixel in FIG. 3B.

As described above, the polarization beam splitter 3 transmits the p-polarized light and reflects the s-polarized light, and the s-polarized light enters the SLM 4.

On the assumption, the light of the pixel in the polarization direction changed to 90° in the SLM 4 (the light of the pixel with the drive signal turned ON) enters the polarization beam splitter 3 as p-polarized light. This allows the light of ON-pixel in the SLM 4 to be transmitted through the polarization beam splitter 3 and guided to the hologram recording medium HM side (FIG. 3A).

On the other hand, the light of the pixel with the drive signal turned OFF in the polarization direction unchanged enters the polarization beam splitter 3 as s-polarized light. That is, the light of OFF-pixel in the SLM 4 is reflected by the polarization beam splitter 3 and not guided to the hologram recording medium HM side (FIG. 3B).

In this manner, by the combination of the SLM 4 as a polarization direction-controlled spatial light modulator and the polarization beam splitter 3, an intensity modulation unit that performs light intensity modulation with respect to each pixel is formed.

Here, the recording and reproducing device of the embodiment employs the coaxial method as the hologram recording and reproduction method. That is, the signal light and the reference light are aligned with the same optical axis, both are applied to the hologram recording medium set in a predetermined position via the common objective lens, and thereby, data recording by the formation of a hologram is performed. Further, at reproduction, the reference light is applied to the hologram recording medium via the objective lens and the reproduced image of the hologram is obtained, and thereby, reproduction of the recorded data is performed.

Figure 4:
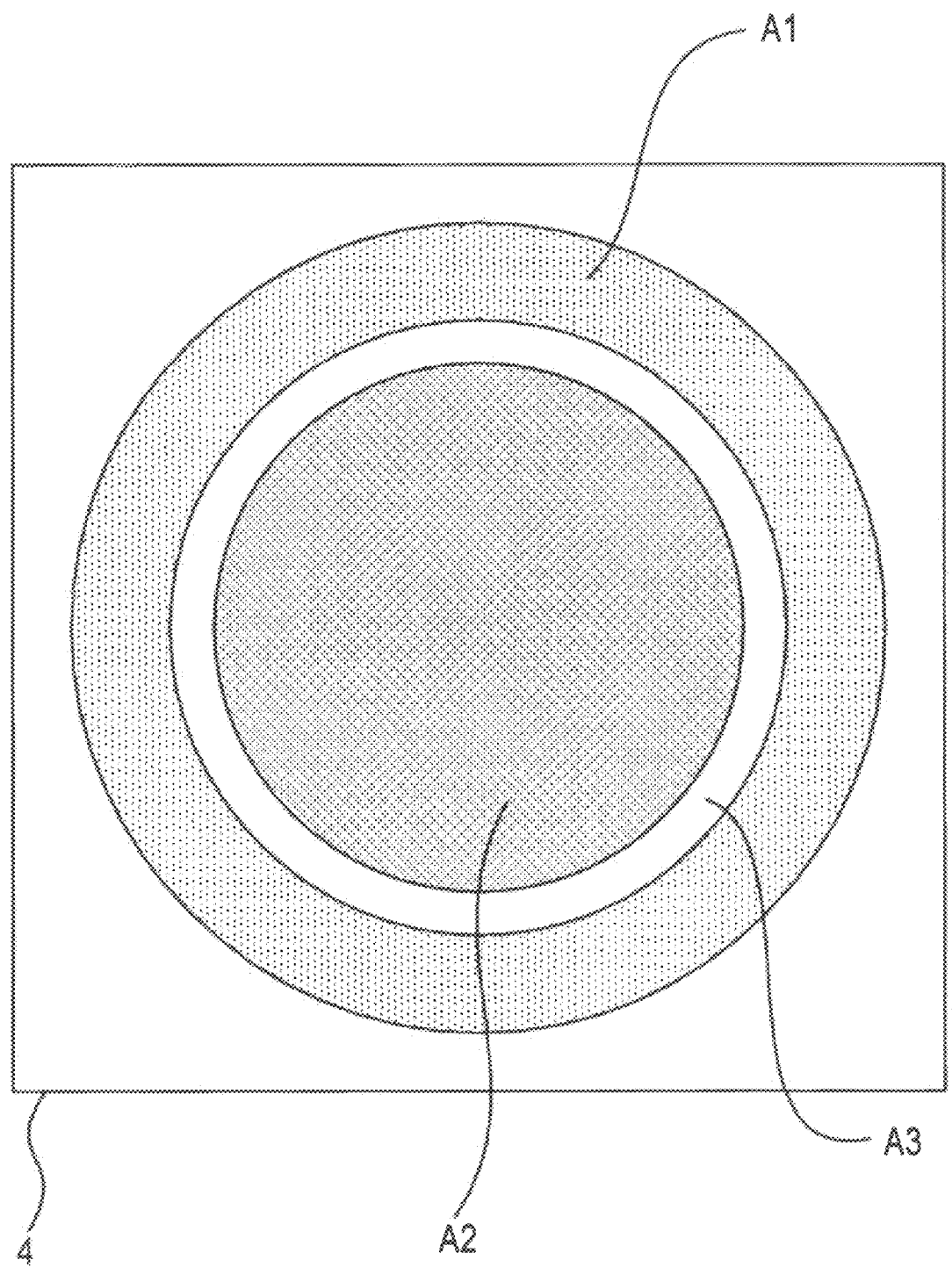
FIG. 4 is a diagram for explanation of respective areas of a reference light area, a signal light area, and a gap area set in the spatial light modulator.

When the coaxial method is employed, in the SLM 4, for aligning the signal light and the reference light with the same optical axis, the respective areas as shown in the next FIG. 4 are set.

As shown in the FIG. 4, in the SLM 4, a circular area of a predetermined range including the center thereof (corresponding to the optical axis center) is set as a signal light area A2. Further, outside of the signal light area A2, an annular reference light area A1 is set with a gap area A3 in between.

By setting the signal light area A2 and the reference light area A1, the signal light and the reference light can be aligned with the same optical axis and applied.

The gap area A3 is defined as an area for avoiding the reference light generated in the reference light area A1 from leaking into the signal light area A2 and acting as noise for the signal light. Therefore, the gap area A3 should basically be a non-transmissive area that blocks incident light.

For confirmation, since the pixel shapes of the SLM 4 are rectangular, the signal light area A2 is not circular in a precise sense. Similarly, the reference light area A1 and the gap area A3 are not annular in a precise sense. In that sense, the signal light area A2 is a nearly circular area, and the reference light area A1 and the gap area A3 are nearly annular areas.

In FIG. 1, the modulation control unit 14 performs drive control on the SLM 4 to generate the signal light and the reference light at recording and generates the reference light at reproduction.

Specifically, at recording, the modulation control unit 14 generates drive signals to provide an on/off pattern according to the supplied recording data to the pixels of the signal light area A2 in the SLM 4, provide a predetermined on/off pattern to the pixels of the reference light area A1, and turn off all of the other pixels, and supplies the signals to the SLM 4. The spatial light modulation (polarization direction control) is performed by the SLM 4 based on the drive signals, and thereby, the signal light and the reference light respectively having the same center (optical axis) are obtained as output light from the polarization beam splitter 3.

Further, at reproduction, the modulation control unit 14 drive-controls the SLM 4 using drive signals to provide a predetermined on/off pattern to the pixels within the reference light area A1 and turn off all of the other pixels, and thereby, to generate only the reference light.

Here, the recording and reproducing device of the embodiment generates marker lights for tilt detection at each time of recording/reproduction of hologram.

The generation of marker lights is realized by drive control of the SLM 4 by the modulation control unit 14, and this point will be further explained later.

Note that, at recording, the modulation control unit 14 operates to generate an on/off pattern within the signal light area A2 with respect to each predetermined unit of input recording data line so that signal light storing the data with respect to each predetermined unit of input recording data line may sequentially be generated. Thereby, recording of data in units of hologram pages (data unit that can be recorded by one interference between the signal light and the reference light) is sequentially performed on the hologram recording medium HM.

The laser beam intensity-modulated in the intensity modulation unit by the polarization beam splitter 3 and the SLM 4 enters the polarization beam splitter 5. The polarization beam splitter 5 also transmits p-polarized light and reflects s-polarized light, and accordingly, the laser beam output from the intensity modulation unit (the light transmitted through the polarization beam splitter 3) is transmitted through the polarization beam splitter 5.

The laser beam transmitted through the polarization beam splitter 5 enters a relay lens system including the relay lens 6 and the relay lens 7. In this case, the aperture 12 is inserted between the relay lens 6 and the relay lens 7 in the relay lens system.

As shown in the drawing, by the relay lens 6, the luminous flux of the laser beam transmitted through the polarization beam splitter 5 is focused on a focal position, and, by the relay lens 7, the laser luminous flux as diffused light after focusing is converted into parallel light. The aperture 12 is provided in the focal position (Fourier surface: frequency surface) by the relay lens 6 and transmits light in a predetermined range around the optical axis and blocks the other light.

In the embodiment, it is obvious that the size of the aperture 12 (the size of the light transmissive area) is set to a size that can transmit marker lights, which will be descried later.

The optical axis of the laser beam through the relay lens 7 is bent to 90° by the mirror 8, and the beam is guided to the objective lens 11 via the partial diffraction element 9→the quarter-wave plate 10.

The partial diffraction element 9 and the quarter-wave plate 10 are provided to prevent the reference light reflected on the hologram recording medium HM at reproduction (reflected reference light) from guiding to the image sensor 13 and acting noise for the reproduced image.

The suppression action of the reflected reference light by the partial diffraction element 9 and the quarter-wave plate 10 will be described later.

The laser beam entering the objective lens 11 is focused on and applied to the hologram recording medium HM.

Here, as described above, at recording, the signal light and the reference light are generated through the intensity modulation by the intensity modulation unit (the SLM 4 and polarization beam splitter 3), and the signal light and the reference light are applied to the hologram recording medium HM through the route explained as above. Thereby, a hologram reflecting recording data by interference fringes between the signal light and the reference light is formed in the recording layer L2 of the hologram recording medium HM, and data recording is realized.

Further, at reproduction, the reference light is generated by the intensity modulation unit and applied to the hologram recording medium HM through the route explained as above. By the application of the reference light, the reproduced image (reproduced light) according to the hologram formed in the recording layer L2 is obtained as reflected light from the reflection film L3. The reproduced image is returned to the device side via the objective lens 11.

Here, the reference light applied to the hologram recording medium HM at reproduction (referred to as "outward reference light") enters the partial diffraction element 9 as p-polarized light according to the operation of the above described intensity modulation unit. As will be described later, the partial diffraction element 9 transmits all outward light and the outward reference light of the p-polarized light passes through the quarter-wave plate 10. In this manner, the outward reference light of the p-polarized light passes through the quarter-wave plate 10 is converted into circularly-polarized light in a predetermined rotational direction and applied to the hologram recording medium HM.

The reference light applied to the hologram recording medium HM is reflected on the reflection film L3 and guided as reflected reference light (return reference light) to the objective lens 11. In this regard, the circularly-polarized light rotational direction of the return reference light is converted into the opposite rotational direction to the predetermined rotational direction by the reflection on the reflection film L3, and thus, the return reference light is converted into s-polarized light via the quarter-wave plate 10.

Here, in consideration of the transition of the polarization state, the suppression action of the reflected reference light by the partial diffraction element 9 and the quarter-wave plate 10 will be explained.

In the partial diffraction element 9, a polarization selection diffraction element having a selection diffraction property according to the polarization state of linearly-polarized light (diffracting one linearly-polarized component and transmitting the other linearly-polarized component) such as a liquid crystal diffraction element, for example, is formed in the area that the reference light enters (an area except the center part). Specifically, in this case, the polarization selection diffraction element of the partial diffraction element 9 transmits p-polarized light and diffracts s-polarized light. Thus, the outward reference light is transmitted through the partial diffraction element and only the return reference light is diffracted (suppressed) by the partial diffraction element 9.

As a result, the situation that the reflected reference light as the return light is detected as a noise component for the reproduced image and SN-ratio becomes lower is prevented.

For confirmation, the area that the signal light enters (the area that the reproduced image enters) of the partial diffraction element 9 is formed by a transparent material or as a hole part, for example, so that the element may transmit both the outward light and return light. Thus, the signal light at recording and the reproduced image at reproduction are transmitted through the partial diffraction element 9.

Further, in this case, in order that the marker light generated within the gap area A3 in the manner described as below may be received by the image sensor 13, in the partial diffraction element 9, the area between the area that the signal light enters and the area that the reference light enters is also formed by a transparent material or as a hole part so that the element may transmit both the outward light and return light of the marker lights.

Here, as understood from the above explanation, in the hologram recording and reproduction system, the reference light is applied to the recorded hologram and the reproduced image is obtained using the diffraction phenomenon, and the diffraction efficiency in this regard is generally less than several percents to one percent. Thus, the reference light returned to the device side as the reflected light in the above described manner has very high intensity relative to the reproduced image. That is, the reference light as the reflected light becomes a noise component not negligible for detection of the reproduced image.

Therefore, the reflected reference light is suppressed by the above described partial diffraction element 9 and quarter-wave plate 10, and the SN-ratio is significantly improved.

The reproduced light obtained at reproduction in the above described manner is transmitted through the partial diffraction element 9. The reproduced light transmitted through the partial diffraction element 9 is reflected by the mirror 8, then, passes through the above described relay lens 7→aperture 12→and relay lens 6, and enters the polarization beam splitter 5. As understood from the above explanation, the reflected light from the hologram recording medium HM is converted into s-polarized light via the quarter-wave plate 10, and the reproduced light entering the polarization beam splitter 5 is reflected by the polarization beam splitter 5 and guided to the image sensor 13.

The image sensor 13 includes an image sensing device such as a CCD (Charge Coupled Device) sensor or a CMOS (Complementary Metal Oxide Semiconductor) sensor, and receives the reproduced light from the hologram recording medium HM guided in the above described manner, converts the light into electric signals and obtains image signals. Thus obtained image signals reflect the on/off pattern (i.e., data pattern of "0" and "1") provided to the signal light at recording. That is, the image signals detected by the image sensor 13 in this manner are readout signals of data recorded in the hologram recording medium HM.

The image signals as the readout signals obtained by the image sensor 13 are supplied to a data reproduction unit 15.

The data reproduction unit 15 performs data identification of "0" and "1" with respect to each value in pixel units of the SLM 4 contained in the image signals from the image sensor 13 and demodulation processing of recorded modulated codes according to need or the like, and reproduces the recorded data.

Further, in the case of the embodiment, the readout signals by the image sensor 13 are also supplied to the tilt control unit 18.

The tilt control unit 18 performs detection of the tilt angle based on the readout signals, and controls the tilt adjustment operation of the spindle motor 16 (the tilt adjustment operation of the hologram recording medium HM) by the tilt mechanism 17 based on the result, and thereby, controls the tilts of the hologram recording medium HM in the radial direction and the tangential direction to be a constant predetermined tilt (the ideal tilt set at design of the optical system: 0° in this case). That is, the unit performs the tilt servo control.

The specific method of the tilt control as the embodiment realized by the tilt control unit 18 and the internal configuration of the tilt control unit 18 will be further explained later.

<2. Regarding Relationships between Tilt and Image Shift>
[2-1. Behavior of Light in Optical System]

Figure 5:
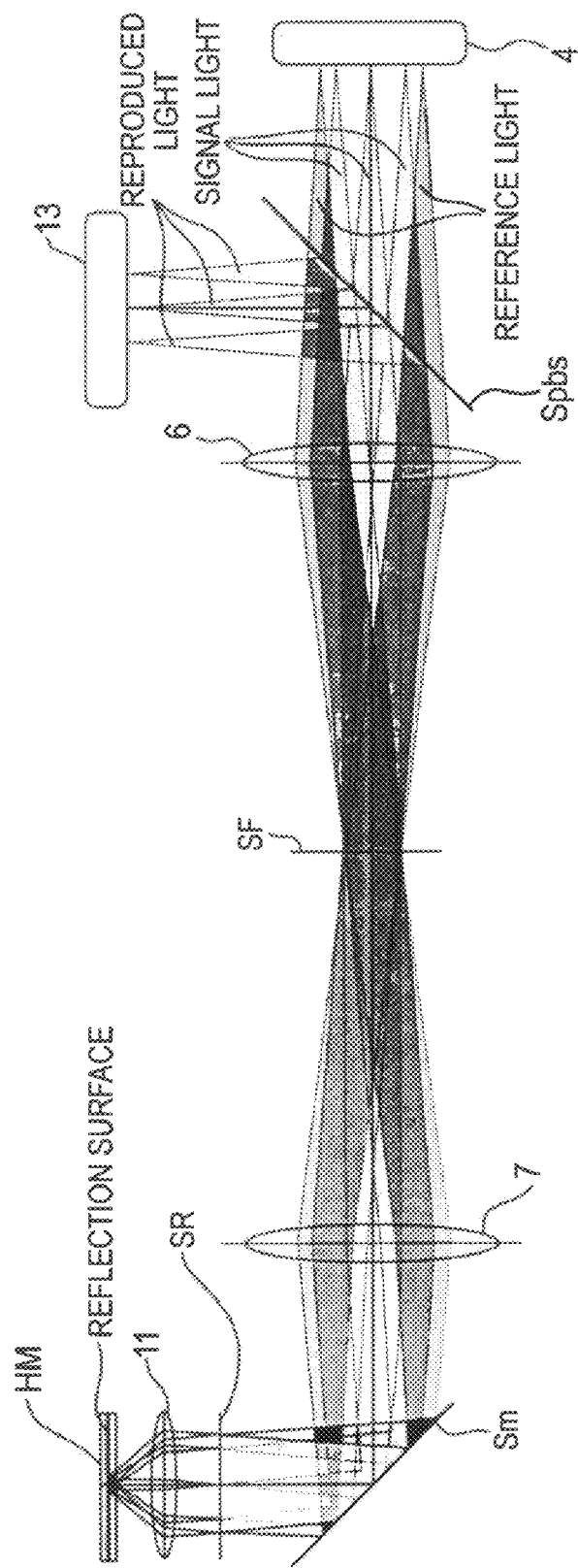
FIG. 5 is a diagram for explanation of a behavior of light in an entire optical system shown in FIG. 1.

FIG. 5 shows a behavior of light in the optical system of the recording and reproducing device shown in FIG. 1 with respect to each beam of light in units of pixels of the SLM 4.

In FIG. 5, of the configuration of the entire optical system, only the SLM 4, the relay lenses 6, 7, the objective lens 11, and the image sensor 13 are extracted and shown. The surface Spbs in the drawing shows the reflection surface of the polarization beam splitter 5 and the surface Sm shows the reflection surface of the mirror 8. In addition, the hologram recording medium HM is also shown in the drawing.

Further, in FIG. 5, regarding the beams of light in units of pixels, three of the signal light and the reproduced light and two of the reference light are representatively shown. Specifically, regarding the signal light and the reproduced light, beams of light of the pixels located at the center of the signal light area A2 (beams of light containing the optical axis of the entire laser luminous flux) and the beams of light of the respective pixels located at the outermost circumference part of the signal light area A2 are representatively shown. Further, regarding the reference light, the beams of light of the respective pixels located at the outermost circumference part of the reference light area A1 are representatively shown.

First, as shown in the drawing, the beams of light output from the respective pixels of the SLM 4 enter the relay lens 6 via the surface Spbs (polarization beam splitter 5) in the state of diffused light. Here, the respective optical axes of the output beams of light from the respective pixels are in parallel.

The beams of light of the respective pixels entering the relay lens 6 are converted from the diffused light into parallel light as shown in the drawing, and the optical axes of the respective beams of light except the beams of light on the laser optical axis (the optical axis of the entire laser luminous flux) are bent to the laser optical axis side. Thus, on the surface SF, the respective beams of light are focused on the center part including the laser optical axis in the parallel light state.

Here, the surface SF is a surface on which the beams of light of the respective pixels of parallel light are focused on the laser optical axis like the focal surface by the objective lens 11 and called the Fourier surface (frequency surface).

Here, as explained in FIG. 1, the aperture 12 is provided on the focal surface by the relay lens 6. In other words, the aperture 12 is provided in a position as the Fourier surface SF in the optical system.

The respective beams of light focused on the Fourier surface SF in the state of parallel light enters the relay lens 7, and, at the same time, the respective beams of light output from the relay lens 6 (except the beams of light of the center pixels including the laser optical axis) intersect with the laser optical axis on the Fourier surface SF. Accordingly, the relationship of the entrance and exit positions of the respective beams of light between the relay lens 6 and the relay lens 7 is a relationship axially symmetric with respect to the laser optical axis.

The respective beams of light are converted into converging light through the relay lens 7 as shown in the drawings and the optical axes of the respective beams of light are in parallel to one another. The respective beams of light through the relay lens 7 are reflected on the surface Sm (mirror 8) and focused on the respective positions on the real image surface SR. The real image surface SR is an object surface for the objective lens 11.

In this regard, the optical axes of the respective beams of light through the relay lens 7 are parallel to one another as described above, and the focus positions of the respective beams of light do not overlap but are individual positions on the real image surface SR.

The respective beams of light focused on the real image surface SR enter the objective lens 11 in the state of diffused light as shown in the drawing. The respective beams of light of the diffused light are converted into parallel light via the objective lens 11 and the optical axes of the respective beams of light (except the beams of light on the laser optical axis) are bent to the laser optical axis side. Thereby, the respective beams of light are focused on the center part including the laser optical axis on the focal surface of the objective lens 11 formed on the hologram recording medium HM.

Here, on the focal surface of the objective lens 11, the respective beams of light are in the state of parallel light and the respective beams of light are focused on one location. As understood from that, the focal surface by the objective lens 11 and the above described Fourier surface SF have a conjugate relation.

In FIG. 5, the respective beams of light of the reproduced light reflected on the surface Spbs and guided to the image sensor 13 are shown, and only the reproduced light is guided to the image sensor 13 as shown in the drawing because the reflected reference light is suppressed by the partial diffraction element 9 (and the quarter-wave plate 10) as described above.

For confirmation, the partial diffraction element 9 is provided in the position as the real image surface SR. This is because the partial diffraction element 9 is necessary to selectively transmit/diffract light in the area of the signal light and the area of the reference light as described above, and, if the element is not provided in the position where the equal image to that on the modulation surface (image formation surface) of the SLM 4 is obtained, it may be impossible to obtain an appropriate action of selective transmission/diffraction.

Further, at reproduction, the reproduced light is obtained in the same area of beams of light as the respective beams of the signal light applied at recording. That is, the respective beams of the reproduced light follow the same positions as the respective beams of the signal light in the drawing and reach the surface Spbs, and are reflected on the surface Spbs and guided to the image sensor 13. Concurrently, the respective beams of the reproduced light output from the relay lens 6 to the surface Spbs side are in the state of converging light as shown in the drawing and the respective optical axes are in parallel, and the respective beams of light are focused on individual positions on the detection surface (reception surface) of the image sensor 13. Accordingly, the same image as the reproduced image on the real image surface SR can be obtained on the detection surface of the image sensor 13.

In this manner, in the optical system in the recording and reproducing device shown in FIG. 1, the modulation surface of the SLM 4, the real image surface SR, the detection surface of the image sensor 13 have conjugate relation with one another.

Figure 6:
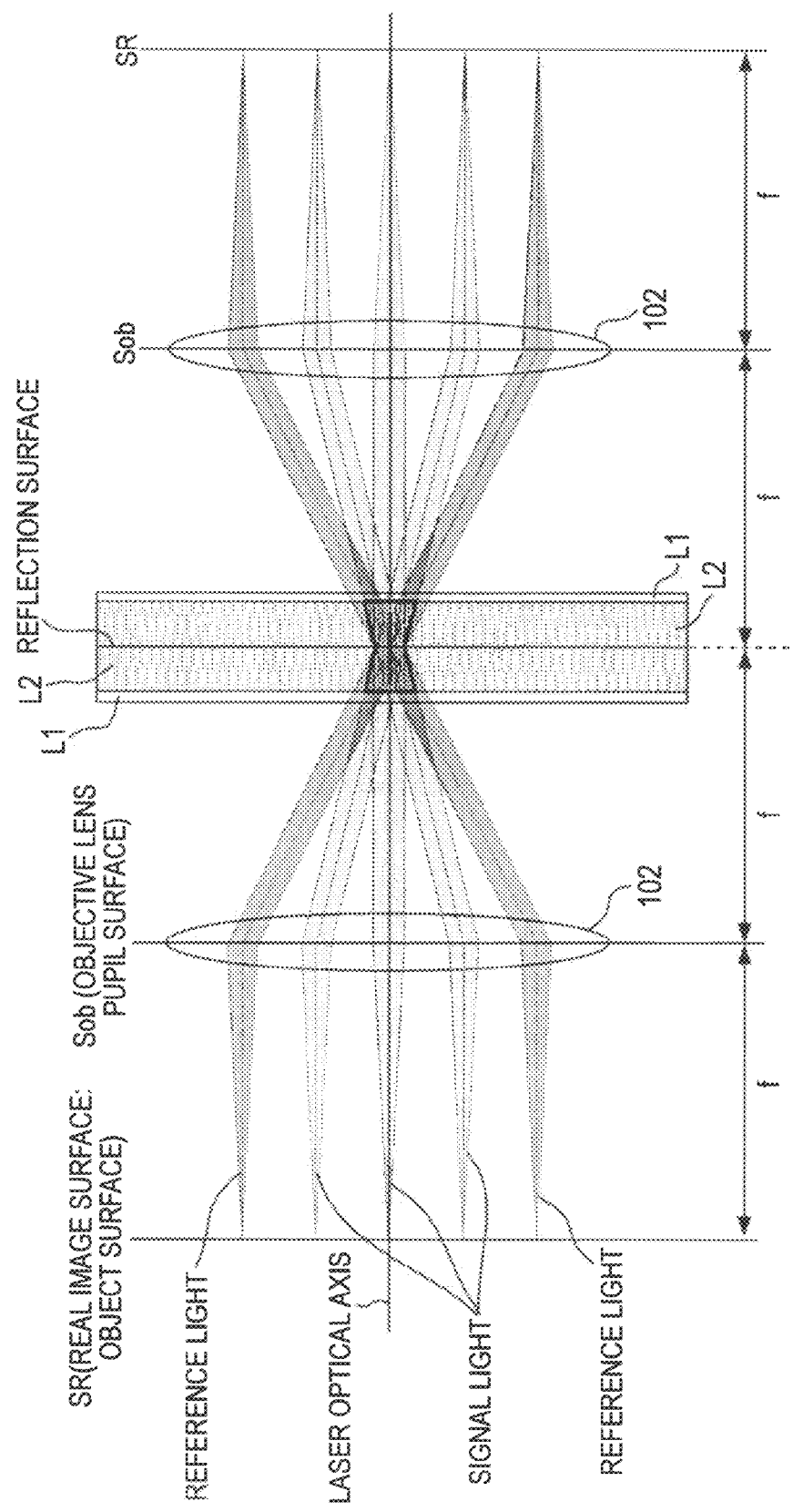
FIG. 6 specifically shows the behavior of light at the downstream of a real image surface in the optical system shown in FIG. 1.

FIG. 6 specifically shows the behavior of light at the downstream of the real image surface SR in the optical system in FIG. 5.

In FIG. 6, only the objective lens 11, the cover layers L1, the recording layers L2, and the reflection surface of the reflection film L3 in the hologram recording medium HM are extracted and shown, and the beams of the signal light and the reference light applied to the hologram recording medium HM are also shown.

As clearly known from the above explanation of FIG. 1, practically, the light reflected by the reflection surface of the reflection film L3 (=return light) returns to the side that the outward light enters, however, in FIG. 6, for convenience of illustration, the return light is folded back to the opposite side to the side that the outward light enters at the reflection surface for illustration together with the recording layer L2, the cover layer L1, and the objective lens 11.

Further, the real image surface SR in FIG. 6 is the same as the real image surface SR shown in FIG. 5. That is, it shows the real image surface of the SLM 4 (the object surface for the objective lens 11) formed by the relay lens system (6, 7).

Further, the surface Sob in the drawing shows the pupil surface of the objective lens 11.

Note that, in FIG. 6, regarding the signal light, only beams of light for a total of three pixels of a beam of light for one pixel at the center aligned with the laser optical axis and beams of light for two pixels respectively located at the outermost circumference part of the respective pixels within the signal light area A2 are extracted and shown. Further, regarding the reference light, only beams of light of two pixels respectively located at the outermost circumference part in the reference light area A1 are extracted and shown.

As understood from the above explanation, in the optical system in this case, the focal positions of the signal light and the reference light are set on the reflection surface of the reflection film L3. That is, the focal distance f of the objective lens 11 is a distance from the pupil surface Sob of the objective lens 11 to the reflection surface.

In this case, the respective beams of the signal light and the respective beams of the reference light are focused on one point on the reflection surface as shown in the drawing.

In this regard, the respective beams of the signal light and the reference light (beams of light with respect to each pixel) are once focused on the real image surface SR as explained in FIG. 5 and enter the objective lens 11 in the state of diffused light. Then, the respective beams entering the objective lens 11 are focused on one point on the reflection surface of the hologram recording medium HM in the state of parallel light.

Here, in the optical system in this case, the optical path lengths of the return light and the outward light are equal, and therefore, the respective beams of the outward light and the return light are symmetric with the reflection surface as the center axis as shown in the drawing. Accordingly, the hologram formed in the recording layers L2 is formed in a symmetric shape as surrounded by the solid frames in the drawing with the reflection surface as the center axis.

For confirmation, the hologram is formed by interference between the signal light and the reference light. Therefore, the hologram is formed in the part where the signal light and the reference light overlap in the recording layer L2. In the coaxial method, the luminous fluxes of the signal light and the reference light are applied to the recording medium to converge on one point (on the reflection surface in this case), and the shape of the hologram formed in this case is the shape like an hourglass as shown in the drawing.

In FIG. 6, the reflected light that actually returns to the outward light side is folded back to the opposite side for illustration, and the shape of the hologram is the hourglass shape as described above, however, in practice, the hologram of the right half (having a trapezoidal shape) in the drawing is formed to overlap with the hologram of the left half in the drawing.

[2-2. Generation Principle of Image Shift Due to Tilt]

As described above, in the hologram recording and reproduction system, an image shift of the reproduced image occurs when a tilt occurs due to warpage of the hologram recording medium HM, that is, the tile angle of the hologram recording medium HM deviates from the ideal angle.

This point will be explained referring to FIG. 7.

In the following explanation, "tilt angle" refers to an incident angle of irradiating light (with reference to the laser optical axis) via the objective lens 11 relative to the information recording surface (the reflection surface in this case) of the hologram recording medium HM. Ideally, the tilt angle is 0°.

Figure 7:
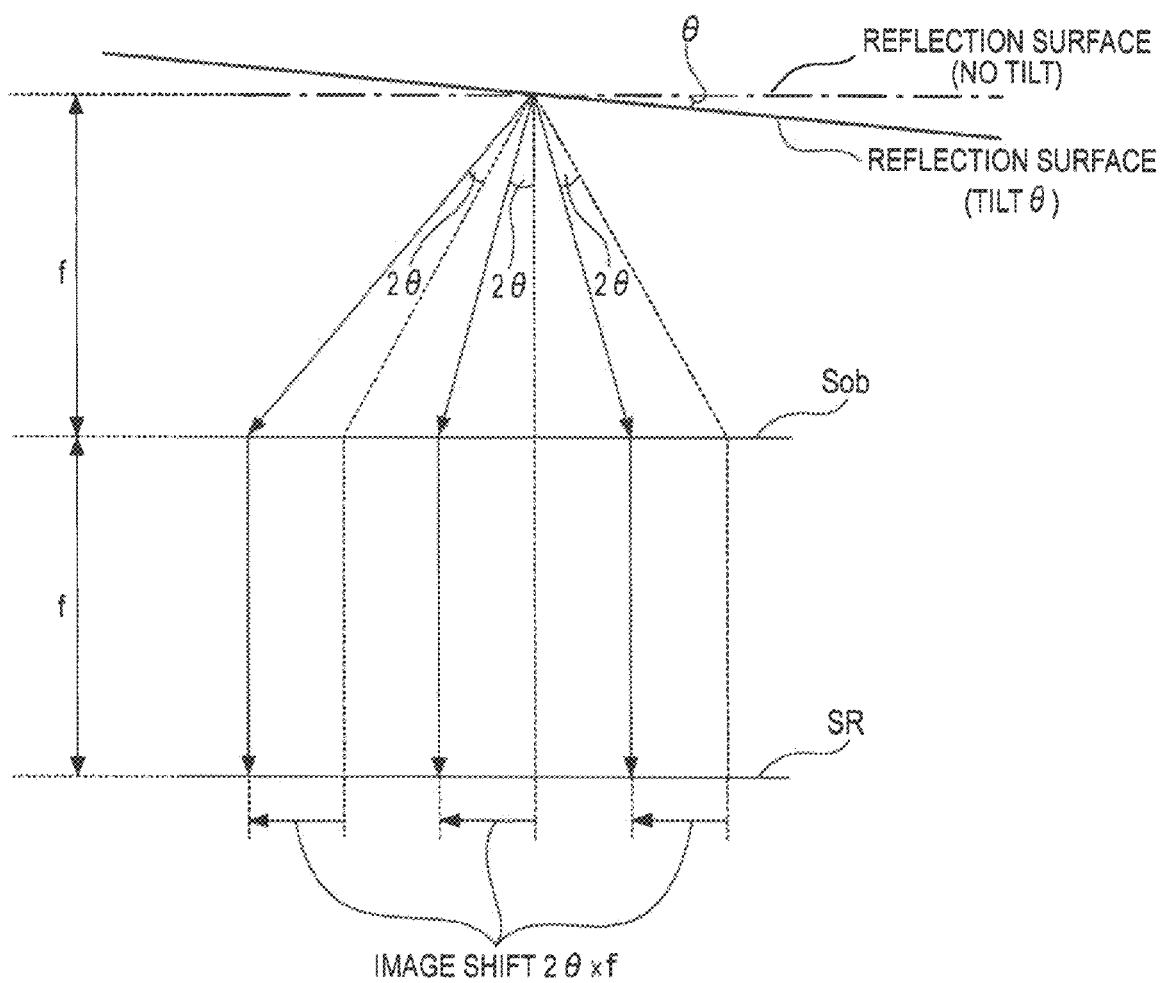
FIG. 7 is a diagram for explanation of occurrence of image shifts of a reproduced image due to occurrence of tilts.

FIG. 7 extracts and shows the real image surface SR, the pupil surface Sob of the objective lens 11, the reflection surface of the hologram recording medium HM, and the respective optical axes of three beams of light within the signal light area via these surfaces as a diagram for explanation of occurrence of image shifts of the reproduced image due to occurrence of tilts.

In FIG. 7, regarding the three beams of light within the signal light area (beams of light in units of pixels), the beam of light having an optical axis aligned with the laser optical axis and the two other beams of light are representatively shown, and the optical axes shown by broken lines in the drawing show the optical axes (outward and return) of the respective beams of light when there is no tilt of the hologram recording medium HM (i.e., tilt=0°: in the case of the ideal angle) and the optical axes shown by the solid line arrows in the drawing respectively show the optical axes of the respective beams of light as the return light (reflected light) when the hologram recording medium HM is tilted at θ°.

As shown in FIG. 7, when the hologram recording medium HM is tilted at θ° (in the case of tilt angle=θ°), the reflected light of the respective beams of light is tilted to 2θ°. This is obvious in consideration of the change of the reflection angle of the light when a plane mirror is tilted.

As understood from that, when the hologram recording medium HM is tilted at θ°, the respective beams of light of the reproduced image obtained from the hologram recording medium HM at reproduction are tilted to 2θ° compared to the case of the ideal angle.

Here, as shown in FIG. 6, since the distance from the reflection surface of the hologram recording medium HM to the pupil surface Sob of the objective lens 11 is "f", on the real image surface SR, the focus points of the respective beams of light of the reproduced image are shifted by 2θ×f relative to the focus points when the tilt angle of the hologram recording medium HM is the ideal angle.

That is, due to the tilt of θ° of the hologram recording medium HM, the image shift of 2θ·f occurs in the reproduced image.

For confirmation, the real image surface SR is a conjugate surface to the light receiving surface of the image sensor 13 (see FIG. 5). That is, the image shift generated on the real image surface SR is similarly generated on the light receiving surface of the image sensor 13, and accordingly, due to the tilt of the hologram recording medium HM to θ°, the image shift of 2θ·f of the reproduced image also occurs on the light receiving surface of the image sensor 13.

Further, naturally, the image shift may occur in the radial direction and the tangential direction, respectively.

Furthermore, when the tilt angle is −θ, the image shift of the reproduced image is −2θ·f.

<3. Tilt Detection and Correction Methods as Embodiments>
[3-1. Generation of Marker Lights]

In the above described manner, in the hologram recording and reproduction system using the coaxial method, the image shift occurs due to occurrence of the tilt.

As described above, in order to prevent deterioration of the reproduction performance due to the image shift of the reproduced image, correction of the tilt of the recording medium (tilt correction) has been performed.

However, in the past, for the tilt correction, a tilt sensor has been provided and the tilt of the recording medium has been directly detected. In the case where the correction method using the tilt sensor is employed, it is necessary to separately provide another sensor in addition to the configuration for recording/reproduction, and downsizing of the device and the cost reduction of the device manufacturing are not realized.

Further, a method of performing tilt correction using the amount of reproduced light as an evaluation index with respect to the tilt angle without especially performing the detection of the tilt angle is conceivable. However, the method using the amount of reproduced light as the evaluation index with respect to the tilt angle is a method of a so-called hill-climbing method, and the time for correction is longer. The hill-climbing correction method has a problem in responsiveness, and accordingly, causes reduction in accuracy in the case where the tilt servo is performed.

Accordingly, in the embodiment, a method of performing detection of tilts from information of the amount of shift of the image using the nature of the image shift due to the occurrence of tilt as explained in FIG. 7 and performing tilt correction based on the detection result is employed.

Specifically, with reference to the light reception position when the tilt angle of the hologram recording medium HM is the ideal angle (0°) (ideal light reception position), a tilt error signal (a signal representing an error from the ideal angle) is obtained from an error between the ideal light reception position and the real image light reception position. Then, adjustment of the tilt angle to make the tilt error signal zero, and thereby, the correction is performed so that the tilt of the hologram recording medium HM may be constant at the ideal angle.

Figure 8:
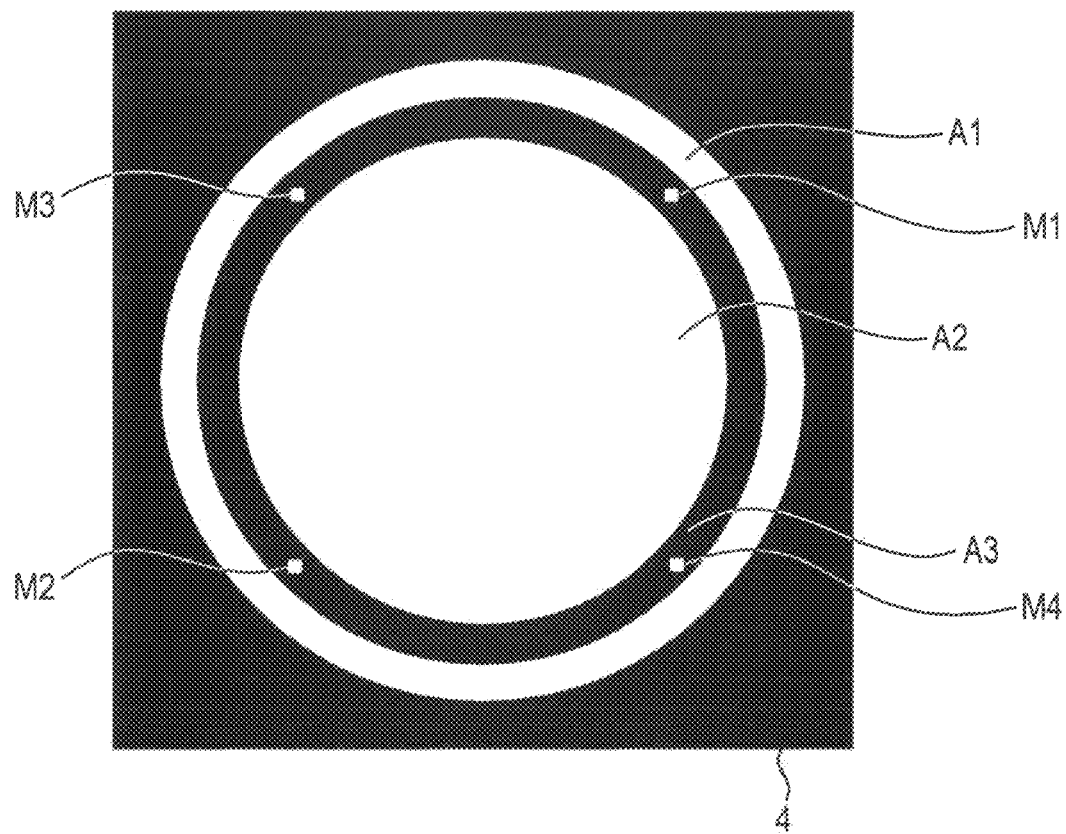
FIG. 8 is a diagram for explanation of marker lights.

In the embodiment, marker lights shown in FIG. 8 are generated for the detection of the error of the light reception position as described above.

In FIG. 8, the respective areas (A1 to A3) set in the SLM 4 are shown, and, for the marker lights, the generation positions are determined as predetermined positions. Specifically, in the embodiment, the marker lights are generated in predetermined positions within the gap area A3 as a boundary area between the reference light area A1 and the signal light area A2.

In addition, in the embodiment, plural marker lights are generated. Specifically, four of marker light M1, marker light M2, marker light M3, marker light M4 are generated.

These four marker lights are generated so that the respective generation positions are sufficiently spaced. Specifically, in this case, the generation positions of the marker light M1 and the marker light M2 are set on one diagonal line of the effective pixel range of the SLM 4 having a nearly square shape, and the generation positions of the marker light M3 and the marker light M4 are set on the other diagonal line. In addition, the set of the marker light M1 and the marker light M2 and the set of the marker light M3 and the marker light M4 are arranged in positions axially symmetric with respect to the laser optical axis.

Here, assuming that the lateral direction of the paper is the x-direction and the longitudinal direction of the paper (i.e., the direction orthogonal to the lateral direction) is the y-direction, the marker lights in this case are located so that the marker light M1 and the marker light M3 are in the same position in the positions in the y-direction of the SLM 4 and spaced in the positions in the x-direction as shown in the drawing. Similarly, the marker light M2 and the marker light M4 are in the same position in the positions in the y-direction of the SLM 4 and spaced in the positions in the x-direction. Further, the marker light M1 and the marker light M4 are in the same position in the positions in the x-direction of the SLM 4 and spaced in the positions in the y-direction, and the marker light M2 and the marker light M3 are similarly in the same position in the positions in the x-direction of the SLM 4 and spaced in the positions in the y-direction.

In this manner, in the embodiment, the four marker lights are arranged to be sufficiently spaced in the x-direction and the y-direction, respectively.

For confirmation, the reference light area A1 and the signal light area A2 are shown in white in FIG. 8, however, this does not mean that all areas A1 and A2 are turned on (transmissive). As understood from the explanation of FIG. 1, the signal light area A2 is sequentially provided with on/off pattern according to the recording data at recording and turned off at reproduction in the entire area, and further, the reference light area A1 is provided with the predetermined on/off pattern at recording and provided with the same on/off pattern as that at recording at reproduction.

Naturally, in the case where only the marker lights are generated, all of the respective areas A1 and A2 are turned off.

Further, in the embodiment, the sizes of the marker lights M1, M2, M3, M4 are set in 4-pixel×4-pixel, for example.

Here, the larger the size of the marker lights, the more effective in easiness of the detection of the light reception positions. Note that, when the size is larger, generation of stray light may be promoted and the deterioration in recording/reproduction performance may be caused. The size of the marker light may be set to a size that is appropriately optimum according to the configuration of the real optical system in consideration of the trade-off relationships.

[3-2. Tilt Detection Method]

In the embodiment, the tilts of the hologram recording medium HM in the radial direction and the tangential direction are detected based on the results obtained by applying the marker lights M1, M2, M3, M4 generated in the above described manner to the hologram recording medium HM and receiving the reflected light by the image sensor 13.

Figure 9A:
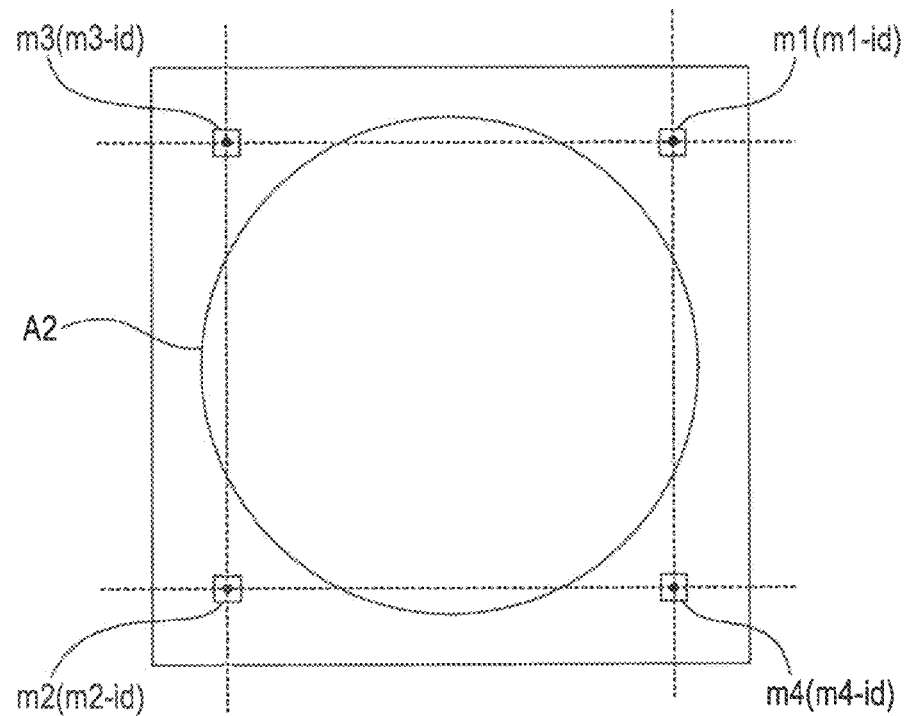
FIGS. 9A and 9B show changes of light reception positions of marker lights with the occurrence of tilts.
Figure 9B:
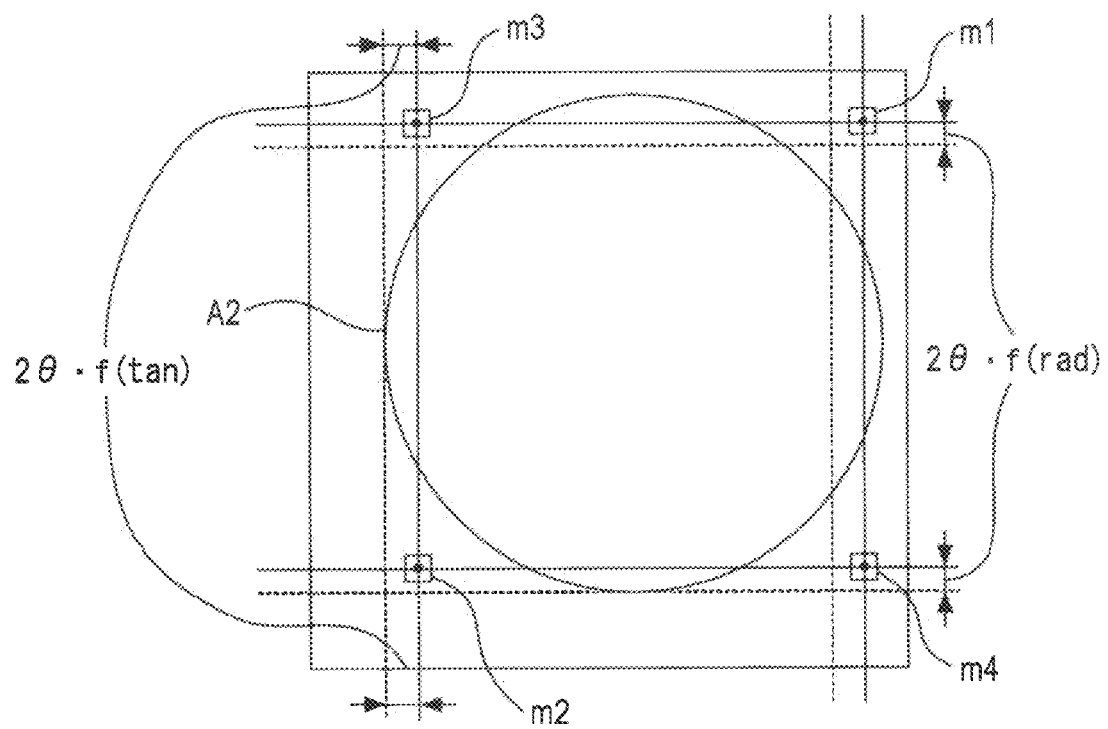

FIGS. 9A and 9B show changes of light reception positions of marker lights M1, M2, M3, M4 with the occurrence of tilts.

FIG. 9A shows application spots m1, m2, m3, m4 of the respective marker lights M1, M2, M3, M4 on the light receiving surface of the image sensor 13 when the tilt angles in the radial direction and the tangential direction of the hologram recording medium HM are the ideal angle=0°, respectively, and FIG. 9B shows the application spots m1, m2, m3, m4 on the light receiving surface when the hologram recording medium HM is tilted by θ° from the ideal angle in the radial direction and the tangential direction, respectively.

In FIGS. 9A and 9B, the application spots of the signal light (the reproduced image at reproduction) are also shown by "A2" in the drawings.

First, the positions where the application spots of the marker lights M1, M2, M3, M4 on the light receiving surface are formed when the tilt angles of the hologram recording medium HM are the ideal angle (light reception positions of the respective marker lights) shown in FIG. 9A are referred to as ideal light reception positions m1-id, m2-id, m3-id, m4-id.

The ideal light reception positions m1-id, m2-id, m3-id, m4-id are obtained at the stage of the design of the system, for example, and accordingly are known information.

Here, as shown by black circles in the drawings, in the embodiment, "light reception position" uses the center position of the area where the application spot is formed as reference. Therefore, as the information of the ideal light reception positions m1-id, m2-id, m3-id, m4-id, it is necessary that the information of the center positions of the marker lights M1, M2, M3, M4 formed on the light receiving surface at least in the ideal state is known.

When the hologram recording medium HM is tilted by θ° from the ideal angle in the radial direction and the tangential direction from the state shown in FIG. 9A, as shown in FIG. 9B, the application spots m1, m2, m3, m4 (light reception positions) of the marker lights M1, M2, M3, M4 are shifted by "2θ·f" in the x-direction and the y-direction relative to the ideal light reception positions m1-id, m2-id, m3-id, m4-id, respectively.

Here, the x-direction and the y-direction on the light receiving surface are aligned with the x-direction and the y-direction on the SLM 4 (because the modulation surface of the SLM 4 and the light receiving surface of the image sensor 13 have a conjugate relationship).

For confirmation, according to the configuration of the optical system shown in FIG. 1, the image shift in the x-direction on the light receiving surface represents the tilt in the tangential direction and the image shift in the y-direction represents the tilt in the radial direction.

That is, in the optical system shown in FIG. 1, the optical axis of the laser beam output from the modulation surface of the SLM 4 is bend to 90° on the mirror 8 and then the beam is applied to the hologram recording medium HM, and accordingly, the x-direction of the image applied via the objective lens 11 is aligned with the tangential direction of the hologram recording medium HM, and the y-direction is aligned to the radial direction of the hologram recording medium HM.

As understood from that, when the output image of the SLM 4 is applied to the hologram recording medium HM without through the bending of the optical axis to 90° by omitting the mirror 8 or otherwise, the image shift in the x-direction on the light receiving surface represents the tilt in the radial direction and the image shift in the y-direction represents the tilt in the tangential direction.

Here, according to the relationship between the tilts and image shifts explained by referring to FIG. 7, the detection of tilts can be performed principally with respect to one marker light by detecting the error between its ideal light reception position and the real light reception position.

However, in practice, distortion of the image due to the characteristics of the optical system or the like is produced, and, if only the error of the light reception position is detected with respect to one marker light, reduction in the accuracy of tilt detection may be caused.

Accordingly, in the embodiment, as shown in FIGS. 10A to 10D, a proper tilt error signal in consideration of the image distortion is obtained by obtaining errors of light reception positions independently with respect to the plural marker lights and averaging the values of the light reception position errors.

FIGS. 10A, 10B, 10C and 10D show a relationship between the ideal light reception position m1-id and the real light reception position m1 with respect to the marker light M1, a relationship between the ideal light reception position m2-id and the real light reception position m2 with respect to the marker light M2, a relationship between the ideal light reception position m3-id and the real light reception position m3 with respect to the marker light M3, and a relationship between the ideal light reception position m4-id and the real light reception position m4 with respect to the marker light M4, respectively, as examples.

Figure 10A:
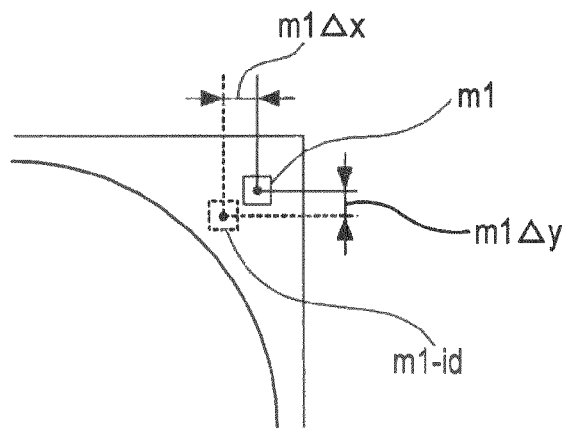
FIG. 10A to 10D show errors between an ideal light reception position and real light reception positions with respect to the respective marker lights.
Figure 10B:
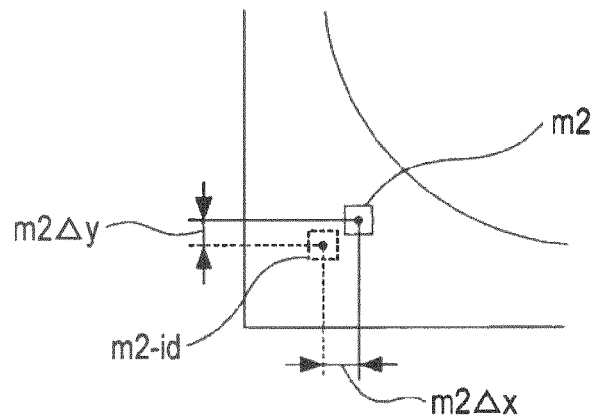
Figure 10C:
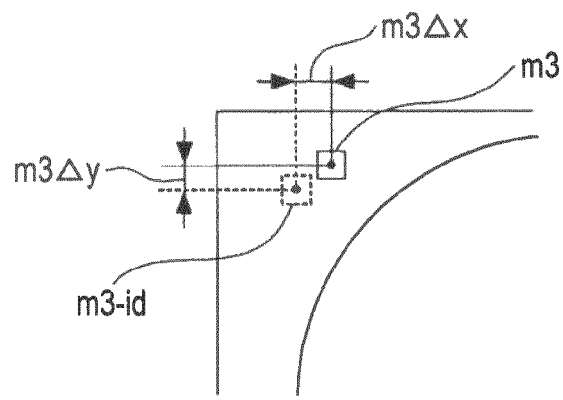

As shown in FIG. 10A, the position error in the x-direction between the ideal light reception position m1-id and the real light reception position m1 of the marker light M1 is referred to as "m1Δx", and the position error in the y-direction is referred to as "m1Δy".

Figure 10D:
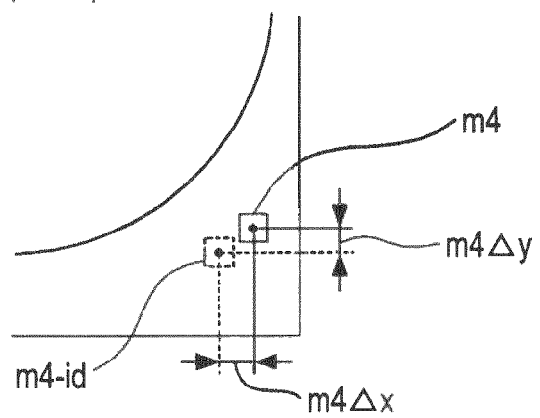

Similarly, the position error in the x-direction between the ideal light reception position m2-id and the real light reception position m2 of the marker light M2 is referred to as "m2Δx", and the position error in the y-direction is referred to as "m2Δy" (FIG. 10B), the position error in the x-direction between the ideal light reception position m3-id and the real light reception position m3 of the marker light M3 is referred to as "m3Δx", and the position error in the y-direction is referred to as "m3Δy" (FIG. 10C), and the position error in the x-direction between the ideal light reception position m4-id and the real light reception position m4 of the marker light M4 is referred to as "m4Δx", and the position error in the y-direction is referred to as "m4Δy" (FIG. 10D).

As shown in the drawings, in the embodiment, the position error between the ideal light reception position and the real light reception position with respect to each maker light is obtained as an error between their centers.

Further, for confirmation, m1Δx to m4Δx representing the position errors in the x-direction, the m1Δy to m4Δy representing the position errors in the y-direction change in positive/negative polarity according to the direction (polarity) of the tilt in the tangential direction and the direction (polarity) of the tilt in the radial direction, respectively.

Figure 11A:
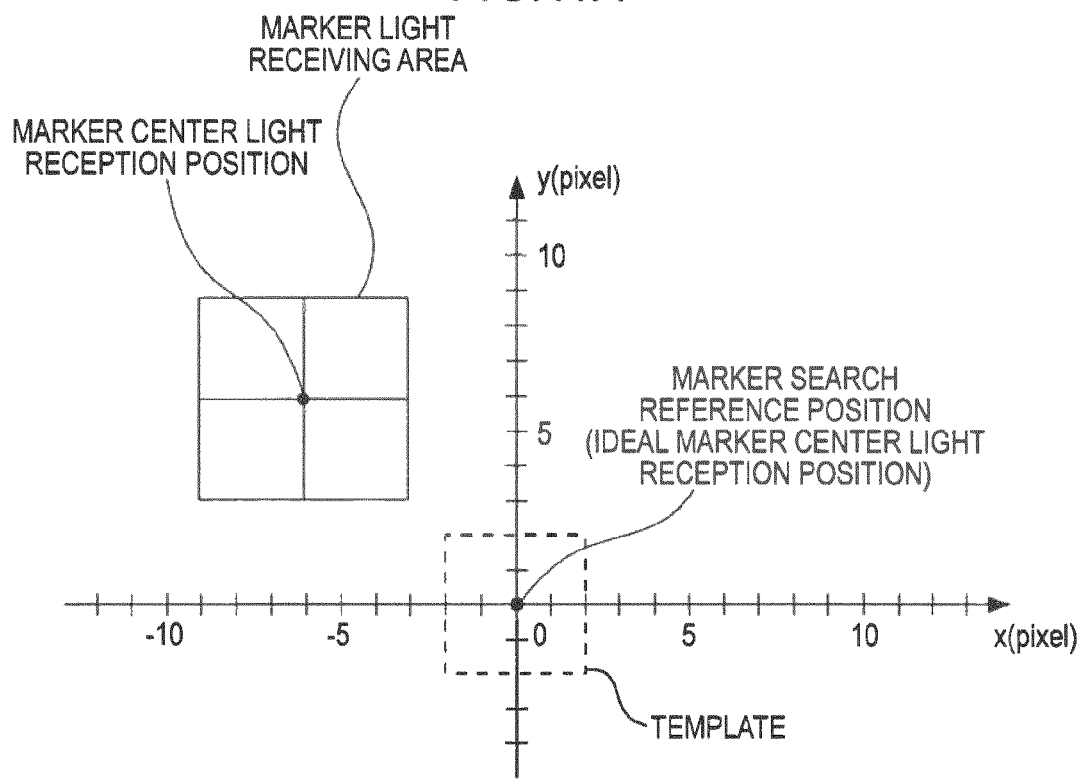
FIGS. 11A and 11B are diagrams for explanation of a specific detection method of the light reception position at the center of the marker light.
Figure 11B:
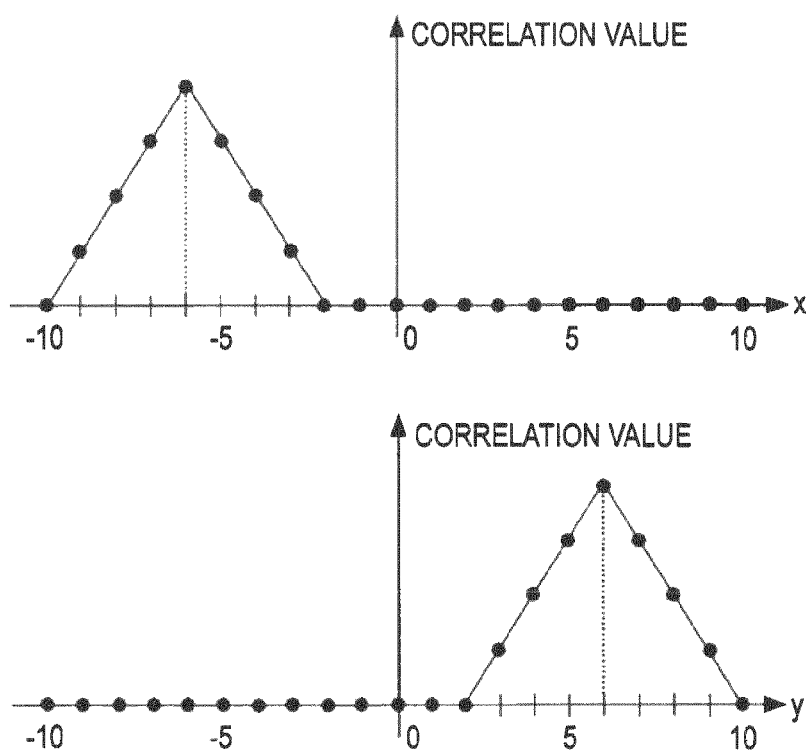

FIGS. 11A and 11B are diagrams for explanation of a specific detection method of the light reception positions of the marker lights.

FIG. 11A schematically shows a relationship between a real marker light receiving area (application spot) and a marker center light reception position and an ideal marker center light reception position on the light receiving surface of the image sensor 13. In FIG. 11A, the light receiving surface is expressed by a two-dimensional surface with the coordinates (x,y) of the ideal marker center light reception position as (0,0). As shown in the drawing, the lateral axis indicates the number of pixels in the x-direction and the longitudinal axis indicates the number of pixels in the y-direction.

In the embodiment, the detection of the light reception position of the marker light center is performed by a so-called correlation detection method. That is, a template (image) having the same pattern as the marker light as a target of detection (in this case, a solid pattern in which all 4×4 pixels are on) is used, correlation values between the detected images and the template in the respective movement positions when the template is moved, and the position having the highest correlativity is detected as the real marker center light reception position.

The correlation calculation in this case is performed using the ideal marker center light reception position on the image sensor 13 with respect to the marker light as a target of detection as a marker search reference position by moving the template with reference to the marker search reference position.

Specifically, in the embodiment, the correlation values between the detected images and the template in the respective movement positions when the template is moved in the respective x-direction and y-direction with reference to the marker search reference position (ideal marker center light reception position) are respectively calculated. That is, by the calculation of the correlation values in the respective directions, the peak position of the correlation values in the x-direction and the peak position of the correlation values in the y-direction are obtained, and the coordinates (x,y) determined by the peak position in the x-direction and the peak position in the y-direction are used as the detection result of the marker center light reception position of the marker light as a target of detection.

FIG. 11B shows a plot of calculation results of the correlation values in the respective movement positions when the template shown in FIG. 11A is moved in the respective x-direction and y-direction with reference to the coordinates (0,0) as the ideal marker center light reception position (marker search reference position) are respectively calculated.

As clearly known from FIG. 11B, when the template is moved in the respective x-direction and y-direction with reference to the search reference position, the peak position of the correlation values in the x-direction coincides with the x coordinate of the real marker center light reception position and the peak position of the correlation values in the y-direction coincides with the y coordinate of the real marker center light reception position.

Accordingly, the peak position in the x-direction and the peak position in the y-direction are obtained in the above described manner, and the coordinates (x,y) determined by the peak positions can be used as the detection result of the marker center light reception position of the marker light as the target of detection.

Note that, in the example of FIGS. 11A and 11B, the case where the peak positions of the correlation values in the x-direction and the y-direction are determined in units of pixels has been taken as an example, however, depending on the relationship between the size of the marker light and the oversampling rate of the image sensor 13, it may be possible that the peak positions are not be obtained in units of pixels. In this case, the respective peak positions may be obtained in units less than the units of pixels by the interpolation calculation based on the calculation results of the correlation values in the respective movement positions in the x-direction and the calculation results of the correlation values in the respective movement positions in the y-direction.

Here, by obtaining the coordinates (x,y) as the marker center light reception position using the above explained method, errors between the ideal light reception position and the real light reception position of the marker light as the target in the x-direction and the y-direction can be obtained.

In the embodiment, the value of the x-coordinate and the value of the y-coordinate obtained by the detection processing of the marker center light reception position as described above are obtained as an error value in the x-direction and an error value in the y-direction between the ideal light reception position and the real light reception position, respectively.

In this manner, the light reception position errors in the x-direction (in this case, corresponding to the tilts in the tangential direction) and the light reception position errors in the y-direction (in this case, corresponding to the tilts in the radial direction) with respect to the marker light M1 to marker light M4 can be obtained.

As described above, in the embodiment, regarding thus individually obtained light reception position errors in the x-direction and light reception position errors in the y-direction with respect to the marker light M1 to marker light M4, their averages are respectively calculated. Specifically, regarding the light reception position errors in the x-direction, (m1Δx+m2Δx+m3Δx+m4Δx)/4 is calculated, and, regarding the light reception position errors in the y-direction, (m1Δy+m2Δy+m3Δy+m4Δy)/4 is calculated.

These calculation results are obtained as a tilt error signal value representing the tilt in the tangential direction and a tilt error signal value representing the tilt in the radial direction, respectively.

In this example, the ideal tilt angle of the tilt of the hologram recording medium HM is 0° (tilt angle=0°), and accordingly, the tilt of the hologram recording medium HM is expressed as an error from the ideal tilt angle=0°. In the sense, the signals representing the respective tilts in the tangential direction and the radial direction of the hologram recording medium HM are referred to as the tilt error signals.

[3-3. Tilt Correction Method]

In the embodiment, so-called tilt servo is realized by performing correction of tilt angles based on the tilt error signal in the tangential direction and the tilt error signal in the radial direction calculated in the above described manner.

Here, as understood from the above explanation, the respective tilt error signals calculated in the above described manner represent the tilt directions (polarity of the tilt values) of the respective tilt angles from the ideal angles in the radial direction and the tangential direction and the amounts thereof, and become signals having amplitude values of "0" in the case where the tilt angles coincide with the ideal angles.

In response, in the embodiment, regarding the respective tilt error angles in the radial direction and the tangential direction, correction of the tilt angles is performed so that the values may be "0". Thereby, the tilt angles can be held constant at the ideal angles and the tilt servo can be realized.

[3-4. Configuration for Realization of Tilt Detection and Tilt Correction Methods]

As the configuration for realization of the tilt detection and the tilt correction methods as the above described embodiment will be explained with reference to FIG. 1 and FIG. 12.

First, in the recording and reproducing device in the embodiment, spatial light modulation for generation of the marker lights M1 to M4 is performed.

Specifically, the modulation control unit 14 shown in FIG. 1 performs drive control to turn on the respective pixels in the generation position of the marker light M1, the generation position of the marker light M2, the generation position of the marker light M3, and the generation position of the marker light M4 set in predetermined positions within the gap area A3 as shown in FIG. 8. That is, at recording, an on/off pattern for all effective pixels of the SLM 4 is produced by combining the on/off pattern according to the recording data within the signal light area A2, and the predetermined on/off pattern of the reference light area A1 that have been explained, and a pattern in which the respective generation positions of the marker lights M1 to M4 within the gap area A3 (in this case, 4×4 pixels, respectively) are on and all of the other pixels (including the outside are of the reference light area A1) are off. Then, the respective pixels of the SLM 4 are drive-controlled according to thus produced on/off pattern for all effective pixels of the SLM 4.

Further, at reproduction, an on/off pattern for all effective pixels of the SLM 4 in which the same on/off pattern as that at recording is used within the reference light area A1, the pixels in the respective generation positions of the marker lights M1 to M4 are on and all pixels other than those in the reference light area A1 and the respective generation positions of the marker lights M1 to M4 are off is provided and the respective pixels of the SLM 4 are drive-controlled according to the on/off pattern.

Here, the tilt detection and the tilt correction using the marker lights may be performed at times other than that during recording/reproduction of the hologram page. In this case, the modulation control unit 14 may not perform drive control for generation of the signal light and the reference light but only perform drive control for generation of the marker lights M1 to M4.

Figure 12:
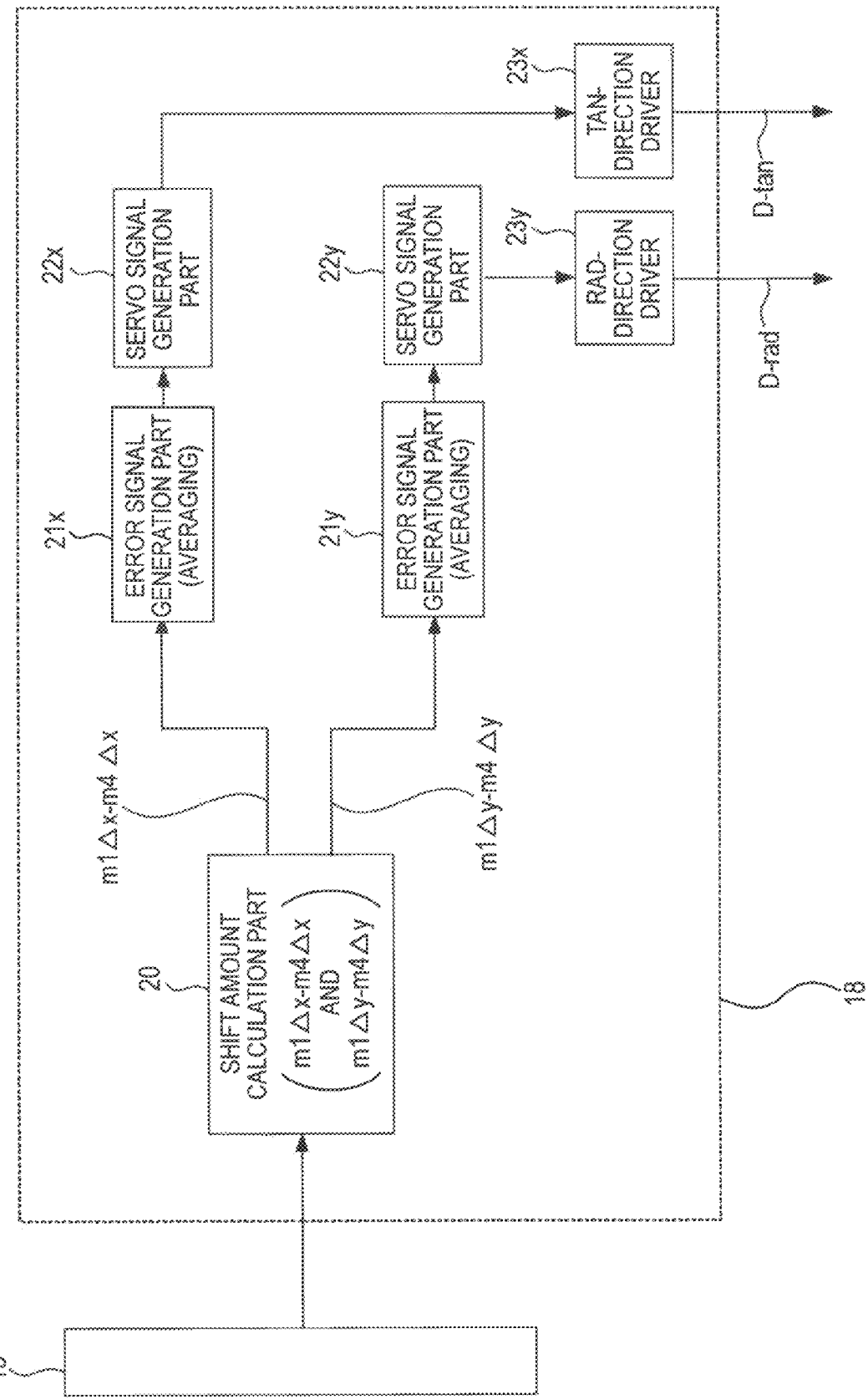
FIG. 12 shows an internal configuration of a tilt control unit provided with the hologram device of the embodiment.

FIG. 12 shows an internal configuration of the tilt control unit 18 shown in FIG. 1.

Note that, in FIG. 12, the image sensor 13 shown in FIG. 1 is shown together with the internal configuration of the tilt control unit 18.

As shown in the drawing, the tilt control unit 18 includes a shift amount calculation part 20, an error signal generation part 21x, an error signal generation part 21y, a servo signal generation part 22x, a servo signal generation part 22y, a tan-direction driver 23x, and a rad-direction driver 23y.

As shown in the drawing, readout signals (image signals) from the image sensor 13 are input to the shift amount calculation part 20.

The shift amount calculation part 20 detects the respective marker center light reception positions of the marker light M1, the marker light M2, the marker light M3, the marker light M4 by the correlation detection system explained in FIGS. 11A and 11B, and thereby, obtains values of the light reception position errors (m1Δx to m4Δx) in the x-direction and the light reception position errors (m1Δy to m4Δy) in the y-direction with respect to each of the marker lights M1 to M4.

In this case, in the shift amount calculation part 20, as information necessary for detection of marker center light reception positions of the respective marker lights, information on ideal marker center light reception positions (marker research reference position in FIG. 11A) with respect to each of the marker lights M1 to M4 and the templates with respect to the marker lights M1 to M4 (in this case, a common pattern in which all 4×4 pixels are on) are set. The shift amount calculation part 20 performs detection of the marker center light reception position (x,y) by the method explained in FIGS. 11A and 11B with respect to each of the marker lights M1 to M4 based on the readout signals from the image sensor 13, the information of the ideal marker center light reception positions with respect to each of the marker lights M1 to M4, and the templates.

Thereby, the light reception position errors m1Δx to m4Δx in the x-direction and the light reception position errors m1Δy to m4Δy in the y-direction with respect to each of the marker lights M1 to M4 are obtained.

The respective values of the light reception position errors m1Δx to m4Δx obtained by the shift amount calculation part 20 are supplied to the error signal generation part 21x, and the respective values of the light reception position errors m1Δy to m4Δy are supplied to the error signal generation part 21y.

The error signal generation part 21x calculates an average value of the light reception position errors m1Δx to m4Δx supplied from the shift amount calculation part 20, and supplies the result to the servo signal generation part 22x.

Further, the error signal generation part 21y calculates an average value of the light reception position errors m1Δy to m4Δy supplied from the shift amount calculation part 20, and supplies the result to the servo signal generation part 22y.

The servo signal generation part 22x performs necessary processing such as gain adjustment or phase compensation on the average value (tangential direction tilt error signal) supplied from the error signal generation part 21x, generates a tilt servo signal (tangential direction tilt servo signal) for realizing the tilt servo in the tangential direction, and supplies it to the tan-direction driver 23x.

Further, the servo signal generation part 22y performs necessary processing such as gain adjustment or phase compensation on the average value (radial direction tilt error signal) supplied from the error signal generation part 21y, generates a tilt servo signal (radial direction tilt servo signal) for realizing the tilt servo in the radial direction, and supplies it to the rad-direction driver 23y.

The tan-direction driver 23x drive-controls the tilt mechanism 17 shown in FIG. 1 by the tangential direction drive signal D-tan in the drawing based on the tangential direction tilt servo signal supplied from the servo signal generation part 22x.

Further, the rad-direction driver 23y drive-controls the tilt mechanism 17 by the radial direction drive signal D-rad in the drawing based on the radial direction tilt servo signal supplied from the servo signal generation part 22y.

According to the above described configuration, the respective tilts of the hologram recording medium HM in the tangential direction and the radial direction are corrected so that the value of the tangential direction tilt error signal obtained in the error signal generation part 21x and the value of the radial direction tilt error signal obtained in the error signal generation part 21y may be "0", respectively. That is, thereby, the tilt servo by which the tilt angle of the hologram recording medium HM are controlled to be constant at the ideal angle (i.e., the tilt angle is constant at the ideal angle=0°) is realized.

[3-5. Summary of Embodiments]

As described above, in the embodiment, in the hologram recording and reproduction system by the coaxial method, tilt detection using the image shift generated due to the occurrence of the tilt is performed. Specifically, the marker lights different from the light for recording/reproduction are generated and applied to the hologram recording medium HM, and the reflected light is received by the image sensor 13, and the position error between the ideal light reception position and the real light reception position with respect to each maker light is detected based on the result. Thereby, the information correlated to the tilt angle (representing the polarity of the tilt with reference to the ideal angle=0° and the amount of tilt) can be obtained. In other words, the tilt error signals representing the errors of the tilt angles from the ideal angle can be obtained.

Further, in the embodiment, the adjustment operation of the tilt angles by the tilt mechanism 17 is controlled based on the tilt error signals obtained in the above described manner. Thereby, the tilt angles can be corrected to coincide with the ideal angle.

According to the embodiment, the detection of the tilt angles (tilt errors) can be performed based on the light reception results of the marker lights applied to the hologram recording medium HM, and thus, the tilt detection can be realized only by addition of the signal processing on the light reception signals (readout signals) by the image sensor 13. That is, it is unnecessary to separately add another configuration by providing a tilt sensor for tilt detection in the past.

In this respect, the downsizing of the device and the cost reduction of the device manufacturing are realized.

Further, according to the embodiment, since the tilt correction can be performed based on the tilt error signals representing the errors from the ideal angle of the tilt angles, the responsiveness of the correction can be significantly improved compared to the case where the correction by the hill-climbing method using the amount of reproduced light as the evaluation index, for example.

Furthermore, the tilt error signals can be obtained as signals having the amplitudes increase and decrease of which represent the amounts and polarity of the tilt errors with reference to the amplitude values of zero. That is, they can be obtained as so-called push-pull signals.

If the tilt error signals of the push-pull signals can be obtained, the tilt servo can be realized by performing the tilt correction to cancel the errors represented by the tilt error signals.

Moreover, in the embodiment, plural marker lights are generated and the light reception position errors are obtained individually with respect to the respective maker lights, and obtains the averages of them as tilt error signals. Thereby, the reduction in reliability of the error signals due to image distortion can be suppressed. That is, the accuracy of the tilt servo can be improved.

Especially, in the embodiment, the respective marker lights are generated in the positions respectively separated in the x-direction and the y-direction within the modulation surface and the averages of the light reception position errors are calculated, and thus, the reduction in reliability of the error signals due to image distortion can be further suppressed and consequently, the accuracy of the tilt servo can be further improved.

Further, in the embodiment, the marker lights are generated within the gap area A3, and thereby, the tilt detection and the tilt correction can be performed without the signal light or reproduced light. That is, the tilt detection and the tilt correction can be performed at any time of recording or reproduction.

Furthermore, since the marker lights are generated within the gap area A3, the tilt detection and the tilt correction can be performed without sacrifice of the recording capacity. At the same time, the suppression effect of the reflected reference light by the partial diffraction element 9 can be obtained as per normal.

<4. Modified Examples>

The embodiments of the invention have been explained, however, the embodiments of the invention are not limited to the specific examples that have been explained.

Figure 13:
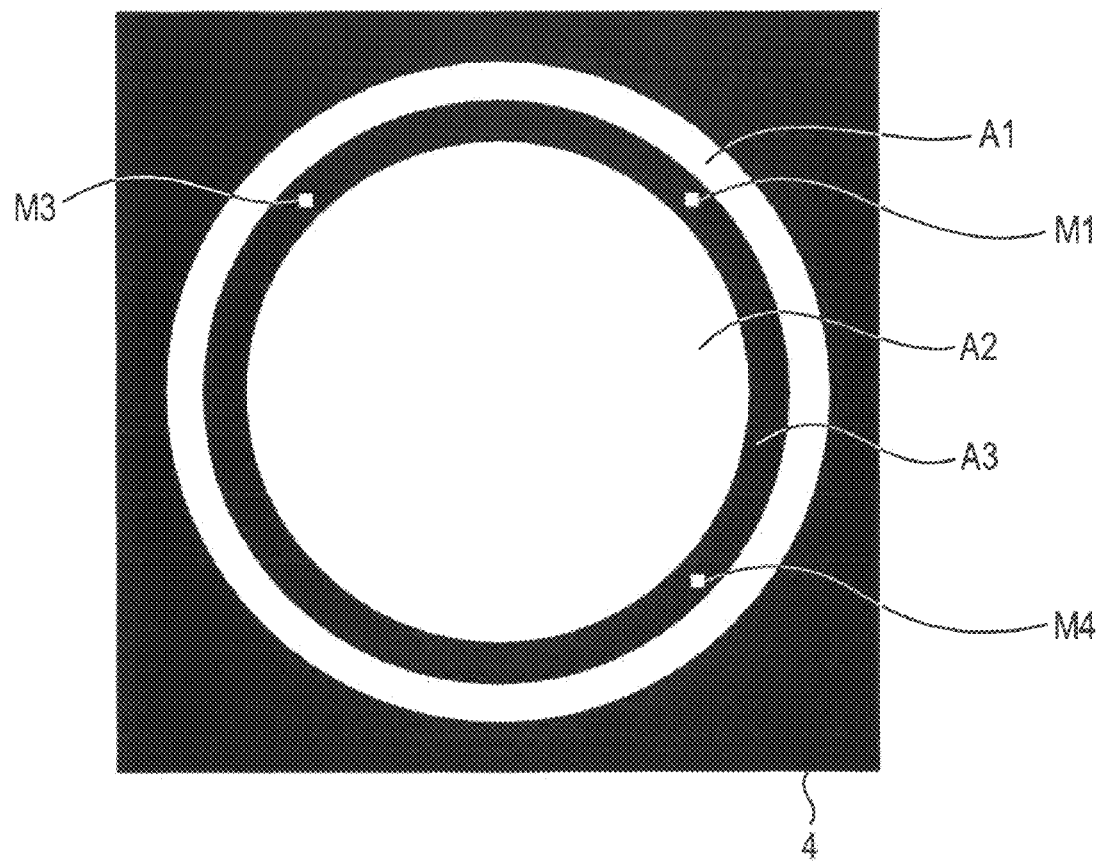
FIG. 13 is a diagram for explanation of a modified example according to generation of marker lights.

For example, the number of marker lights and the generation positions thereof exemplified in the above explanation are just examples, and a modified example as shown in FIG. 13 may be possible.

The modified example shown in FIG. 13 is an example formed by omitting one marker light from the marker lights M1 to M4 shown in FIG. 8. Specifically, in the modified example, the marker light M2 is omitted.

According to the three marker lights M1, M3, M4, the set of [M1,M3] and the set of [M1,M4] are spaced in the x-direction and the y-direction, respectively. That is, as understood from that, if at least three marker lights are generated, the spaced arrangement in the x-direction and the y-direction for accommodating the image distortion can be realized. Specifically, in the case where the image distortion is accommodated by the three marker lights, the three marker lights may be generated so that one set of two marker lights spaced in the x-direction and one set of two marker lights spaced in the y-direction may be obtained.

For confirmation, in this case, the point that the light reception position errors are individually obtained with respect to each marker light and the tilt error signals are obtained by calculating the average values of them may be the same as in the case of the embodiment.

Alternatively, in the case where the three marker lights are generated, when the image distortion is considered, the average calculation for the light reception position errors of all marker lights as exemplified in the embodiment may not be performed, but the tilt error signal in the tangential direction and the tilt error signal in the radial direction may be obtained, respectively, by individually detecting the position errors in the respective directions at least in the set of marker lights spaced in the x-direction and set of marker lights spaced in the y-direction and individually calculating the average values of the position errors in the respective directions.

Specifically, regarding the marker lights spaced in the x-direction, the position errors from the ideal light reception positions in the x-direction are respectively calculated, and the tilt error signal corresponding to one of the tilts in the tangential direction and the radial direction is obtained by the calculation of the average value of them. Further, regarding the marker lights spaced in the y-direction, the position errors from the ideal light reception positions in the y-direction are respectively calculated, and the tilt error signal corresponding to the other of the tilts in the tangential direction and the radial direction is obtained by the calculation of the average value of them.

Further, in the above explanation, the case where plural marker lights have been taken as the example, however, in the embodiments of the invention, at least only one marker light may be generated. In this case, the tilt error signal is obtained by detection of the light reception position error with respect to the one marker light. For confirmation, in this case, the position error in one direction on the light receiving surface (the x-direction when the optical system in FIG. 1 is used) is detected to obtain the error signal in the tangential direction, and the position error in a direction orthogonal to the one direction on the light receiving surface (the y-direction when the optical system in FIG. 1 is used) is detected to obtain the error signal in the radial direction.

Here, the "one direction" is a direction defined as a direction in which an image shift occurs due to the tilt in one of the tangential direction and the radial direction.

It is obvious that the method of averaging the values of the light reception position errors individually detected with respect to the plural markers as exemplified in the embodiment is advantageous intolerance for the above described image distortion.

Further, in the above explanation, the case where the generation positions of the marker lights are set within the gap area A3 has been exemplified, however, the generation positions of the marker lights should not be limited to those, but other generation positions in an area outer than the reference light area A1, for example, may be used.

Furthermore, in the above explanation, the pattern of the marker light has been set to the so-called solid pattern in which all pixels are on, however, the spatial light modulation pattern set for the marker light should not be limited to the solid pattern, but another pattern may be used.

Moreover, in the above explanation, the case where the light receiving parts for receiving the marker lights are also used as the image sensor 13 for receiving the reproduced image of the hologram has been exemplified, however, the light receiving parts for detection of the marker lights may be separately provided from the image sensor 13.

Further, in the above explanation, the case where the tilt mechanism (tilt angle adjustment part) for adjustment of the tilt angle is adapted to adjust the tilt of the hologram recording medium has been exemplified, however, in addition, the tilt angle adjustment part may be realized by the configuration of
  1) adjusting the tilt of the entire optical system,
  2) slidingly driving the objective lens, or
  3) performing wavefront correction using a liquid crystal element.

For example, in the case of the configuration of 1), there is a configuration of adjusting the tilt of the entire optical pickup shown by the broken line in FIG. 1.

Further, in the case of the configuration of 2), an actuator that slidingly drives the objective lens 11 in FIG. 1 in a direction in parallel to in the radial direction and/or the tangential direction of the hologram recording medium HM may be provided.

Furthermore, in the case of the configuration of 3), a liquid crystal element that performs wavefront correction of the incident light to the objective lens 11 may be provided.

Moreover, in the above explanation, the case where the embodiment of the invention is applied to the reproduction with respect to the hologram recording medium HM has bee exemplified, however, the embodiment of the invention may preferably be applied to the case where reproduction is performed with respect to a transmissive hologram recording medium having no reflection film.

In the case where the transmissive hologram recording medium is supported, the reproduced light is transmitted through the entire hologram recording medium and output to the opposite side to the application side of the reference light. Accordingly, in the optical system in this case, an objective lens located at the rear side of the hologram recording medium for the reproduced light to enter as the transmitted light and an optical system (reproduction optical system) that enters and guides the reproduced light via the objective lens to the light receiving part is provided.

Further, in the above explanation, the case where the embodiment of the invention is applied to both recording/reproduction for the hologram recording medium has been exemplified, however, the embodiment of the invention may preferably be applied to the case where only recording or reproduction is performed.

In the case where only recording is performed, the spatial light modulation unit provided in the hologram device may be adapted to generate marker lights and generate both the signal light and the reference light. On the other hand, in the case where only reproduction is performed, the spatial light modulation unit may be adapted to generate marker lights and the reference light.

Figure 15A:
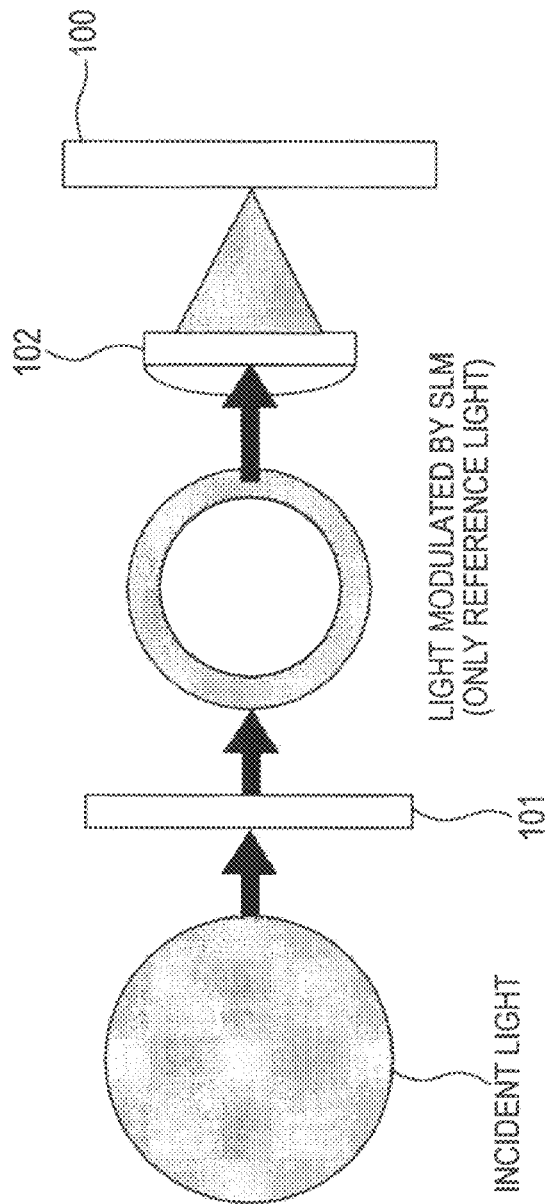
FIGS. 15A and 15B are diagrams for explanation of a reproduction method of the hologram by the coaxial method.
Figure 15B:
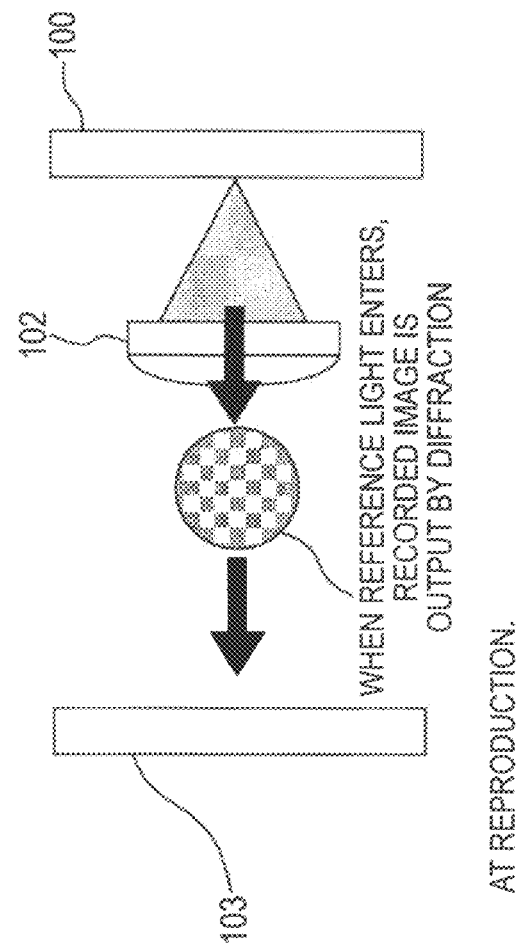

Further, in the above explanation, the case where intensity modulation for maker lights, reference light and signal light is realized by a combination of the polarization direction-controlled spatial light modulator and the polarization beam splitter has been exemplified, however, the configuration for realizing the intensity modulation should not be limited to that. For example, the intensity modulation may be realized using a spatial light modulator that can perform intensity modulation alone such as the SLM 101 using the transmissive liquid crystal panel explained in FIGS. 14 and 15A and 15B and a DMD (Digital Micro mirror Device: registered trademark).

The present application contains subject matter related to that disclosed in Japanese Priority Patent Application JP 2009-100665 filed in the Japan Patent Office on Apr. 17, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A hologram device comprising:
  a light source that applies light to a hologram recording medium having a recording layer in which information recording is performed by interference fringes between signal light and reference light;
  a spatial modulation unit that generates the signal light in a signal light area and/or the reference light in a reference light area with a gap area in between the signal light area and the reference light area for isolating the areas, and generates a marker light in a predetermined position within the gap area of an incident surface of the light from the light source by performing spatial light modulation on the light from the light source;

a light applying unit that applies the light subjected to spatial light modulation by the spatial light modulation unit to the hologram recording medium via an objective lens;

a light receiving unit that receives the light applied via the objective lens through the hologram recording medium; and a tilt detection unit that obtains a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

2. The hologram device according to claim 1, wherein the tilt detection unit obtains the tilt error signal corresponding to one of tilts in a tangential direction and a radial direction based on a result of detection of a position error in a first direction within a light receiving surface of the light receiving unit between the ideal light reception position and the real light reception position of the marker light.

3. The hologram device according to claim 2, wherein the tilt detection unit obtains the tilt error signals corresponding to both of tilts in the tangential direction and the radial direction based on respective results of detection of the position error in the first direction within the light receiving surface and detection of a position error in a second direction orthogonal to the first surface within the light receiving surface between the ideal light reception position and the real light reception position of the marker light.

4. The hologram device according to claim 1, wherein the spatial modulation unit generates plural marker lights, and the tilt detection unit detects the position error between the ideal light reception position and the real light reception position with respect to each of the plural marker lights received by the light receiving unit.

5. The hologram device according to claim 4, wherein the spatial modulation unit generates, as the plural marker lights, at least three or more marker lights to obtain one set of two marker lights spaced in a first direction within the incident surface and one set of two marker lights spaced in a second direction orthogonal to the first direction within the incident surface.

6. The hologram device according to claim 5, wherein the spatial modulation unit generates a total of four marker lights to obtain two sets of marker lights so that the respective generation positions may be axially symmetric with respect to optical axes of the light from the light source, and the tilt detection unit obtains a tilt error signal corresponding to one of tilts in the tangential direction and the radial direction by detecting the position error between the ideal light reception position and the real light reception position in the first direction with respect to each of the four marker lights received by the light receiving unit and calculating an average value of the errors, and obtains a tilt error signal corresponding to the other of tilts in the tangential direction and the radial direction by detecting the position error between the ideal light reception position and the real light reception position in the second direction with respect to each of the four marker lights received by the light receiving unit and calculating an average value of the errors.

7. The hologram device according to claim 1, further comprising:

a tilt angle adjustment unit that performs adjustment of the tilt angle; and a tilt correction control unit that controls the tilt angle adjustment unit to correct the tilt angle based on the tilt error signal obtained by the tilt detection unit.

8. The hologram device according to claim 7 wherein the tilt angle adjustment unit performs adjustment of the tilt angle by tilting the hologram recording medium.

9. The hologram device according to claim 7, wherein the tilt angle adjustment unit performs adjustment of the tilt angle by tilting the entire optical system including the light applying unit.

10. The hologram device according to claim 7, wherein the tilt angle adjustment unit performs adjustment of the tilt angle by slidingly driving the objective lens in a direction in parallel to the radial direction and/or tangential direction of the hologram recording medium.

11. The hologram device according to claim 7, wherein the tilt angle adjustment unit performs adjustment of the tilt angle by performing wavefront correction on the light incident to the objective lens using a liquid crystal element.

12. A tilt detection method in a hologram device including a light source that applies light to a hologram recording medium having a recording layer in which information recording is performed by interference fringes between signal light and reference light, a spatial light modulation unit that generates the signal light in a signal light area and/or the reference light in a reference light area with a gap area in between the signal light area and the reference light area for isolating the areas by performing spatial modulation on the light from the light source, a light applying unit that applies the light subjected to spatial light modulation by the spatial light modulation unit to the hologram recording medium via an objective lens, and a light receiving unit that receives the light applied via the objective lens through the hologram recording medium, the method comprising the steps of:

generating a marker light in a predetermined position within the gap area of an incident surface of the light from the light source using the spatial light modulation unit; and obtaining a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit.

13. A tilt correction method in a hologram device including a light source that applies light to a hologram recording medium having a recording layer in which information recording is performed by interference fringes between signal light and reference light, a spatial light modulation unit that generates the signal light and/or the reference light by performing spatial modulation on the light from the light source, a light applying unit that applies the light subjected to spatial light modulation by the spatial light modulation unit to the hologram recording medium via an objective lens, and a light receiving unit that receives the light applied via the objective lens through the hologram recording medium, the method comprising the steps of:

generating a marker light in a predetermined position within an incident surface of the light from the light source using the spatial light modulation unit;

obtaining a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit; and performing correction of the tilt angle based on the tilt error signal obtained at the tilt detection step by adjusting the tilt of the hologram recording medium.

14. A hologram device comprising:

a light source that applies light to a hologram recording medium having a recording layer in which information recording is performed by interference fringes between signal light and reference light;

a spatial modulation unit that generates the signal light and/or the reference light and generates a marker light in a predetermined position within an incident surface of the light from the light source by performing spatial light modulation on the light from the light source;

a light applying unit that applies the light subjected to spatial light modulation by the spatial light modulation unit to the hologram recording medium via an objective lens;

a light receiving unit that receives the light applied via the objective lens through the hologram recording medium; and a tilt detection unit that obtains a tilt error signal representing an error from an ideal angle of a tilt angle as an incident angle of the applied light via the objective lens to an information recording surface of the hologram recording medium based on a result of detection of an error between an ideal light reception position of the marker light in the light receiving unit and a real light reception position of the marker light by the light receiving unit;

a tilt angle adjustment unit that performs adjustment of the tilt angle by tilting the hologram recording medium; and a tilt correction control unit that controls the tilt angle adjustment unit to correct the tilt angle based on the tilt error signal obtained by the tilt detection unit.

* * * * *